(12) United States Patent
Mahalle et al.

(10) Patent No.: US 11,900,391 B2
(45) Date of Patent: Feb. 13, 2024

(54) METHODS AND SYSTEMS FOR CONNECTING WITH A CUSTOMER SERVICE REPRESENTATIVE FOR A FINANCIAL TRANSACTION

(71) Applicant: Mastercard International Incorporated, New York, NY (US)

(72) Inventors: Rajesh Pralhadrao Mahalle, Pune (IN); Jitendra Singh Wadhwa, Hadapsar (IN); Surbhi Malhotra, Pune (IN)

(73) Assignee: MASTERCARD INTERNATIONAL INCORPORATED, New York, NY (US)

( * ) Notice: Subject to any disclaimer, the term of this patent is extended or adjusted under 35 U.S.C. 154(b) by 62 days.

(21) Appl. No.: 17/189,639

(22) Filed: Mar. 2, 2021

(65) Prior Publication Data

US 2021/0272127 A1    Sep. 2, 2021

(30) Foreign Application Priority Data

Mar. 2, 2020    (IN) .............................. 202041008894

(51) Int. Cl.
*G06Q 20/42*    (2012.01)
*G06Q 30/02*    (2023.01)
(Continued)

(52) U.S. Cl.
CPC ......... *G06Q 20/425* (2013.01); *G06Q 20/386* (2020.05); *G06Q 30/0281* (2013.01); *H04L 9/3231* (2013.01); *H04M 3/5141* (2013.01)

(58) Field of Classification Search
CPC .............. G06Q 20/425; G06Q 20/386; G06Q 30/0281; H04L 9/3231; H04L 51/02;
(Continued)

(56) References Cited

U.S. PATENT DOCUMENTS

2013/0124508 A1* 5/2013 Paris ....................... G06F 16/51
707/723
2017/0318152 A1* 11/2017 Chen ................. H04M 3/42068
(Continued)

FOREIGN PATENT DOCUMENTS

CA        3059454 A1 * 5/2020 ........... G06Q 30/016

*Primary Examiner* — Patrick McAtee
*Assistant Examiner* — Vincent I Idiake
(74) *Attorney, Agent, or Firm* — Pramudji Law Group PLLC; Ari Pramudji

(57) ABSTRACT

Embodiments provide methods, and server systems connecting with a customer service representative/agent for a financial transaction. A method includes sending, by a server system, a message related to a financial transaction to a user device using a messaging protocol. The message includes at least one option to receive a response of the message from the user device for connecting with an agent. The method includes receiving the response of the message from the user device. The response includes an authentication data. The method includes verifying the authentication data. Upon successful verification, the method includes electronically extracting at least one context of the message from the response. The method includes sending the at least one context to a Customer Service Centre (CSC) server. The CSC server is configured to assign the agent to the user based on the at least one context for an upcoming conversation about the message.

19 Claims, 16 Drawing Sheets

(51) Int. Cl.
*H04L 9/32* (2006.01)
*G06Q 20/38* (2012.01)
*H04M 3/51* (2006.01)

(58) Field of Classification Search
CPC ............ H04L 2209/56; H04M 3/5141; H04M 3/5166; H04M 2203/105; H04M 2203/6045; H04M 3/42382
See application file for complete search history.

(56) References Cited

U.S. PATENT DOCUMENTS

| | | | |
|---|---|---|---|
| 2018/0219830 A1* | 8/2018 | O'Brien | H04L 51/08 |
| 2020/0007493 A1* | 1/2020 | Nair | G06F 40/30 |
| 2020/0014642 A1* | 1/2020 | Sidi | H04M 3/5141 |
| 2020/0334678 A1* | 10/2020 | Dutt | G06Q 20/425 |
| 2021/0266725 A1* | 8/2021 | Gray | H04L 41/046 |

* cited by examiner

METHODS AND SYSTEMS FOR CONNECTING WITH A CUSTOMER SERVICE REPRESENTATIVE FOR A FINANCIAL TRANSACTION

TECHNICAL FIELD

The present disclosure relates to facilitating customer services for financial transactions and, more particularly to, methods and systems for sending one or more contexts of a customer service message related to a financial transaction in advance to a customer service centre for connecting with a customer service representative for an upcoming conversation.

BACKGROUND

Short Message Service (SMS) messaging is the simplest but very effective way of communication today as it offers a quick information exchange between parties. Implementing SMS messaging in the financial sector means that the banks can notify their customers with SMS text messages on their registered mobile numbers about their financial transactions. As the recipient can decide about the proper time to read them, the messages will not be considered as intrusive in comparison with telephone callings. Thus, SMS technology in the finance sector ensures a competitive advantage as it highly increases customer satisfaction. For financial transactions performed using banking cards, such as credit cards, debit cards, prepaid cards, etc., there also exists regulations for the banks to send mandatory SMS alerts for transactions through debit card, for Automated Teller Machine (ATM) cash withdrawals, National Electronic Funds Transfer (NEFT) and Real-Time Gross Settlement (RTGS) transactions, once funds are credited in a beneficiary account. A bank typically outsources this service to a third-party SMS gateway through an annual contract with structured tariff plans. The SMS gateway provides various alerts through SMS services for fraud prevention, low account balance, new or changed conditions, premium renewal, fund transfers, bill payments, etc. Other services include overdue payment reminders, financial transactions notifications, promotional offers, invoice reminders and the like.

In an example scenario, a customer/user receives a message displaying text, "you have spent 2500 INR via Debit card xx2856 at Loyalty Lounge on 2019 Jun. 21, 20:18:15. Available Balance 25000 INR. Not you? Call 1800xxxxx or click here" on his mobile phone from the issuer of the debit card or a third-party SMS gateway. If the user did not do the transaction mentioned in the message, he would immediately want to report the transaction as fraud by calling on to the number provided in the message. Generally, multiple customer service representatives (hereinafter alternatively referred to as "agents") are employed by the banks (or outsourced by the banks to third party customer service centers) to resolve customer issues by way of a call or a chat communication with the customers. When the user calls the number mentioned in the message, the call is handled by an automated telephony system technology known as Interactive Voice Response (IVR) that interacts with the caller, gathers the required information and routes the calls to an available agent. For example, the IVR software responds by giving the caller a pre-recorded greeting and then asks the caller to choose an option from a set menu.

In such a scenario, the user needs to hear all the options from the menu and select the applicable option for connecting with an agent. Many times, it happens that all the agents are busy at the moment in handling calls from other customers. The user needs to further wait for a stipulated amount of time to connect with the agent. This may lead to frustration and the user may end the call without even being connected. Moreover, if the call is connected, the user needs to first authenticate himself and then explain the whole issue that he needs to resolve. This is a time-consuming process. Further, if the call gets disconnected due to poor network connectivity on either side, the user needs to repeat the whole process and it may happen that a different agent receives the call to whom the user has to explain the issue again.

Similarly, if the user would have clicked the web link provided in the message, he would be directed to a web page where a virtual agent/chatbot chats with the customer to address the issue. The chatbot is an artificial intelligence (AI) software that can simulate a conversation (or a chat) with a user in natural language through messaging applications, websites, mobile applications etc. The user, via a text chat, also needs to answer all the questions asked by the chatbot to authenticate himself and explain the issue. That is an equivalently time-consuming process compared to the calls with the human agents.

Accordingly, there is a need for techniques that connect the user directly to an applicable option from the menu of the IVR system for connecting with a customer service representative for an upcoming conversation.

SUMMARY

Various embodiments of the present disclosure provide systems, methods, electronic devices and computer program products for connecting with a customer service representative for a financial transaction.

In an embodiment, a computer-implemented method is disclosed. The method includes sending, by a server system, a message related to a financial transaction to a user device of a user using a messaging protocol. The message includes at least one option to receive a response of the message from the user device for connecting with a customer service representative. The method includes, receiving, by the server system, the response of the message from the user device. The response includes an authentication data. The method includes, verifying, by the server system, the authentication data. Upon successful verification of the authentication data, the method includes electronically extracting, by the server system, at least one context of the message from the response. The method includes, sending, by the server system, the at least one context to a Customer Service Centre (CSC) server. The CSC server is configured to assign the customer service representative to the user based on the at least one context for an upcoming conversation about the message.

In another embodiment, a server system is provided. The server system includes a communication interface configured to send a message related to a financial transaction to a user device of a user using a messaging protocol. The message includes at least one option to receive a response of the message from the user device for connecting with a customer service representative. The communication interface is further configured to receive a response of the message from the user device. The response includes an authentication data. The server system includes a memory including executable instructions and a processor communicably coupled to the communication interface. The processor is configured to execute the instructions to cause the server system to at least verify the authentication data. Upon successful verification of the authentication data, the server system is further caused to electronically extract at least one context of the message from the response. The server system is further caused to send the at least one context to a Customer Service Centre (CSC) server. The CSC server is configured to assign the customer service representative to the user based on the at least one context for an upcoming conversation about the message.

In yet another embodiment, a computer program product is disclosed. The computer program product includes at least one non-transitory computer-readable storage medium. The computer-readable storage medium includes a set of instructions, which, when executed by one or more processors in an electronic device, causes the electronic device to at least send a message related to a financial transaction to a user device of a user using a messaging protocol. The message includes at least one option to receive a response of the message from the user device for connecting with a customer service representative. The electronic device is further caused to receive a response of the message from the user device. The response includes an authentication data. The electronic device is further caused to verify the authentication data. Upon successful verification of the authentication data, the electronic device is further caused to electronically extract at least one context of the message from the response. The electronic device is further caused to send the at least one context to a Customer Service Centre (CSC) server. The CSC server is configured to assign the customer service representative to the user based on the at least one context for an upcoming conversation about the message.

BRIEF DESCRIPTION OF THE FIGURES

For a more complete understanding of example embodiments of the present technology, reference is now made to the following descriptions taken in connection with the accompanying drawings in which.

Figure 1:
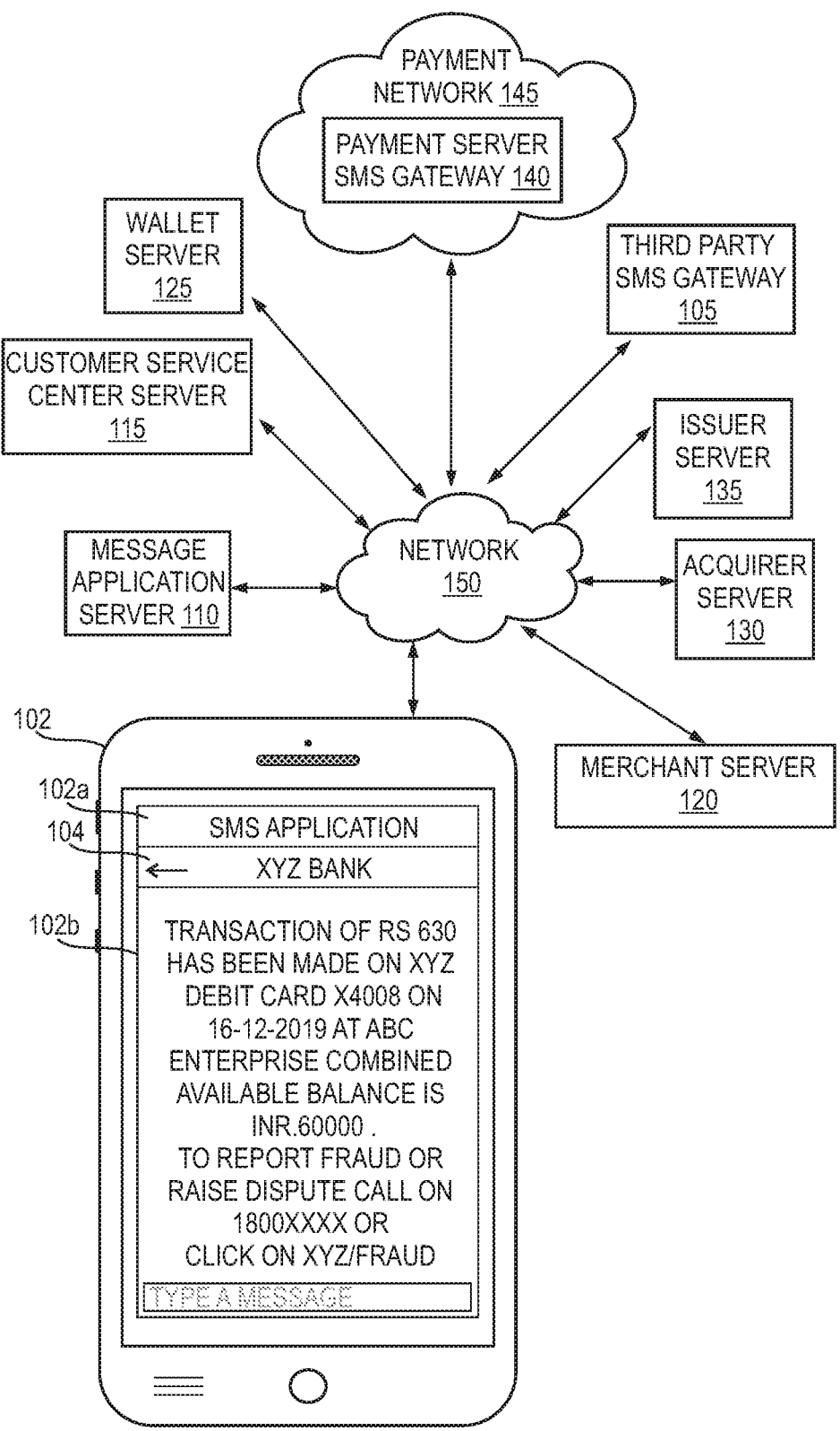
FIG. 1 illustrates an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" at various places in the specification is not necessarily all referring to the same embodiment, nor to separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund the financial transaction (interchangeably referred to as "payment transaction"). Examples of the payment account include, but are not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by digital wallet or other payment application.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be operated to perform transactions via cash-substitutes, which may include payment cards, letters of credit, checks, financial accounts, etc. One example of a payment network includes those operated by Mastercard.

The term "payment card", used throughout the description, refers to a physical or virtual card linked with a financial or payment account that may be used to fund a financial transaction to a merchant or any such facility via the associated payment account. Examples of the payment card include, but are not limited to, debit cards, credit cards, prepaid cards, virtual payment numbers, virtual card numbers, forex cards, charge cards and stored-value cards. A payment card may be a physical card that may be presented to the merchant for funding the payment. Alternatively, or additionally, the payment card may be embodied in form of data (e.g., a digital token) stored in a user device, where the data is associated with the payment account such that the data can be used to process the financial transaction between the payment account and a merchant's financial account.

The term "customer service representative", used throughout the description, refers to a customer support agent (alternatively referred to as an "agent") inclusive of a human agent and/or a virtual agent hired/supported/developed by an enterprise to interact with its customers via various enterprise channels. A conversation/interaction between the customer and the agent may be achieved through enterprise Websites and native mobile applications that typically display a widget or provide clickable web links, which upon being accessed by a customer enable a chat or, in some cases, a voice interaction or a video interaction, with the agent. Alternatively, a conversation with an agent may be achieved via a voice call over a cellular network using a toll free or a phone number provided by the enterprise to the customer. The voice call may be handled by an automated telephony system technology known as Interactive Voice Response (IVR) that interacts with the caller, collects the required information by asking the caller to choose an option from a set menu and routes the calls to an agent based on the user selection of an option. The conversation may also be achieved via SMS text messages exchanged between the customer and the agent.

Overview

Various example embodiments of the present disclosure provide methods, systems, user devices and computer program products for facilitating means for sending one or more contexts of a customer service message related to a financial transaction prior to an upcoming conversation with a customer service representative to a customer service centre so as to enhance customer experience by quickly resolving the purpose of the conversation.

In various example embodiments, the present disclosure provides a server system configured to send a message related to a financial transaction to a user device of a user using a messaging protocol or data channel. The message is sent over a communication network such as a cellular network or Internet. Accordingly, the message may be an SMS text, or a data message sent via an application running on the user device. In one embodiment, the message may be sent by a payment server associated with a payment network. The payment server may be configured to work as an SMS gateway that provides value added services to its customers such as an issuer bank, an acquirer bank, various merchants and the like. For example, if the issuer bank has opted the value added service then the payment server acting as the SMS gateway, handles all the incoming and outgoing messages related to the financial transactions and analyses the messages on behalf of the issuer bank for the customers/end users of the issuer bank.

The message is customized to include one or more options to receive a response of the message from the user device for connecting with a customer service representative (i.e. an agent) for an upcoming conversation. In at least one embodiment, the response of the message is received by the server system in a pre-defined text format (an example of an option of the one or more options) from the user device for connecting with the agent. For example, the message may be customized to include additional text, "reply to this SMS by typing 'context xxx' to send the context to an agent", where x can be a digit or a letter or a combination thereof as pre-defined and provided to the user in advance. The message may include one or more contexts. As the response is received from the user's registered mobile number, the registered mobile number is considered as a user authentication data and is verified. Upon successful verification, the response is parsed by the server system to electronically extract at least one context. In an embodiment, a predefined time period is also assigned to such context and the context for the upcoming call lapses in case the user doesn't reach out within that time frame.

In one embodiment, the response is encrypted using a biometric information (another example of an option) and sent from the user device for connecting with the agent. In this scenario, the message may be sent as an SMS using a mobile network or as a data message using the internet. In both the types, the user is enabled to provide a biometric information such as a fingerprint scan. For example, long pressing the message or a link in the message may enable encryption of the message using the fingerprint scan. The biometric information with the underlying message as a response is received by the server system. The biometric information is verified by the server system as an authentication data of the user. Upon successful verification, the server system decrypts the encrypted response using the biometric information. Further, the response is parsed to extract the at least one context.

In another embodiment, one more option to receive the response of the message from the user device for connecting with the agent is receiving the response as a multimedia message via an application running on the user device using the internet. Some non-exhaustive examples of the multimedia message include one or more of a voice data, an image data, a video data and a text data. For example, for a message received via an application, the user may be able to record a voice message as a response and send the response as a reply to that message using the same application or another application facilitating similar features. Further, the user's voice is considered as an authentication data and is verified by the server system. Alternatively, if the user has received an SMS, he may be able to copy the content and paste in a message field of a UI of the application to send the response via internet. Furthermore, the user may also send a picture of the location, store, payment card, ATM kiosk, and the like as the context of the call. For example, a picture of an ATM machine along with its tagged location could also be sent as a context if the query is regarding the recent transaction happened at the ATM. Upon successful verification of the authentication data, the server system, electronically extracts at least one context of the message from the response received in a multimedia format.

The server system is further configured to send the context to a Customer Service Centre (CSC) server configured to assign the agent to the user based on the context for an upcoming conversation about the message. The CSC server is configured to send an assignment notification signal about an agent assigned to the user based on the context of the message for the upcoming conversation. The agent may be a human agent or a chatbot. The conversation may be a voice call, a video call or a text chat. The server system sends a notification message about assignment of the agent to the user device. The notification message also includes a pre-determined time limit for connecting with the agent. Various example embodiments of present disclosure are described hereinafter with reference to FIGS. 1 to 15.

FIG. 1 illustrates an example representation of an environment 100, in which at least some example embodiments of the present disclosure can be implemented. In an example scenario, a user (not shown) performs a financial transaction using a payment card. The user is provided with a payment card by a card issuer such as an issuer bank. A corresponding issuer server 135 is associated with a financial institution normally called as an "issuer bank" or "issuing bank" or simply "issuer", in which the user may have an account, which issues a payment card, such as a credit card or a debit card. The user can use the payment card data associated with the payment card to tender payment for a purchase from a merchant. To accept payment, a merchant establishes an account with a financial institution that is part of the financial payment system. This financial institution is usually called the "merchant bank" or the "acquiring bank" or "acquirer bank" or simply "acquirer". The acquirer server 130 is associated with the acquirer bank.

A payment network 145 may be used by the payment cards issuing authorities as a payment interchange network. Using the payment network 145, the computers of the acquirer bank/the acquirer server 130 or the merchant processor will communicate with the computers of the issuer/the issuer server 135 to determine whether the customer's account is in good standing and whether the purchase is covered by the customer's available account balance. Based on these determinations, authorization of the payment transaction is declined or accepted. When the authorization is accepted, the available balance of the customer's account is decreased using operations such as clearing and settlement of the transactions carried by a payment server 140 associated with the payment network 145.

In various cases, as per the mandatory regulations for the transactions made using payment cards, the issuer banks are required to notify the user on his registered mobile number by sending a Short Message Service (SMS) about the transaction. Apart from using the SMS technology to deliver core functionalities like sending text messages to alert customers about withdrawals and deposits only, banks provide real-time bank updates and alerts of account activity and fraud detection also for improving user experience.

A user device 102 (e.g., a smartphone 102) is shown on which an SMS application 102*a*) is running. Other examples of the user device 102 include, but are not limited to, a personal computer (PC), a desktop computer, a mobile phone, a tablet device, a Personal Digital Assistant (PDA), a voice activated assistant, a Virtual Reality (VR) device, and a laptop. The SMS application 102*a* can be a pre-installed messaging application on the user device 102 or can be downloaded by the user. A User Interface 102*b* (UI 102*b*) of the SMS application 102*a* is shown to display a message 104 displaying text, 'Transaction of Rs. 630 has been made on XYZ debit card x4008 on Dec. 12, 2019 at ABC enterprise. Combined available balance is INR 60,000. To report fraud or raise dispute call on 1800xxxx or click xyz/fraud.'. The message is related to a financial transaction.

The SMS gateway is an interface for sending/receiving SMS and value-added services. A third-party SMS gateway (or an Issuer SMS gateway) 105 (hereinafter alternatively referred to as SMS gateway 105) is hired by the issuer bank for handling messages to be sent to and received from the user for such financial transactions. The SMS gateways 105 utilizes a communication network such as a cellular network or an Internet data network to send the message 104 to the end-user. Accordingly, a Short Message Peer to Peer (SMPP) protocol is used by the SMS gateway 105 to send the message 104 first to a Short Message Service Center (SMSC) which forwards the message 104 to the recipient's mobile number and the message 104 is displayed via the SMS application 102*a* on the user device 102. Alternatively, the SMS gateway 105 is configured to send the message 104 via a message application (not shown in FIG. 1) running on the user device 102 using Internet. The message application is facilitated by a message application server 110. A messaging protocol such as Hyper Text Transfer Protocol (HTTP) may be used by the SMS gateway 105 to send the message 104 over the internet to the message application server 110 which in turn forwards the message 104 to the user device 102 via the message application.

In at least one embodiment, a payment server 140 associated with the payment network 145 is configured to provide value added services such as features and operations of an SMS gateway (e.g., the SMS gateway 105) to various entities such as an issuer bank, an acquirer bank, an e-wallet provider, a merchant etc. In turn, these entities receive increased sales and end-user satisfaction with SMS campaigns, instant OTPs, notifications, two-way interactions, and bulk SMS services provided by the payment server 140.

For example, a wallet application (not shown) is facilitated by a wallet server 125. The wallet server 125 is associated with a token requestor/e-wallet provider which needs to register with a token service provider (e.g., the payment server 140) in order to request generation of the digital tokens. Digital wallet platforms such as Apple pay®, Samsung pay®, Google pay®, Microsoft Wallet® etc., provide mobile and web applications using which the users can use the generated digital tokens for digital payments. Further, the user may select a prepaid e-wallet maintained by the wallet server 125 or a digitized payment card as a preferred payment method from the wallet application. In such cases, when the transaction happens through the wallet application, a corresponding message on behalf of the wallet server 125 is sent by the payment server 140 (if the e-wallet provider has opted for the value added service) or the SMS gateway 105 (if hired by the e-wallet provider) to the user device 102.

As another example, a message regarding a payment amount temporarily held by the issuer server 135 for a pending authentication of a customer needs to be sent to a merchant on his merchant device by the acquirer server 130. This can be handled by the payment server 140 working as the SMS gateway or the third-party SMS gateway 105.

As yet another example, a merchant providing an e-commerce application with an in-built prepaid e-wallet also needs to notify the user for the transactions occurring through the prepaid e-wallet. For example, the user needs to be notified immediately about a transaction failed due to an insufficient balance in the prepaid account of the user for a recent purchase attempted through the e-commerce application. The merchant himself can manage to send the message to the user via a dedicated application or hire the SMS gateway 105 or opt for the value-added service provided by the payment server 140 acting as an SMS gateway to send such notifications to the user.

Various embodiments of the present disclosure provide mechanisms such that one or more contexts of the message 104 are sent in advance to a customer service centre (CSC) server 115 (hereinafter alternatively referred to as CSC server 115) as a response to the message 104 for an upcoming conversation with a customer service representative/agent by the payment server 140 or the SMS gateway 105 or any of the corresponding entity (e.g., the issuer server 135, the acquirer server 130, the merchant server 120, the wallet server 125 etc.) whichever is handling the message communication. The message 104 is customized to include one or more options that can be utilized by the user to send the response. Further, a pre-authentication of the user using various authentication data is also facilitated to save time when the actual conversation with the agent begins.

The CSC server 115 is associated with a customer service centre of an enterprise. Some non-exhaustive examples of the enterprise include, but not limited to, an issuer bank, a merchant, an acquirer bank, a token requestor, a payment gateway, an independent third-party customer service enterprise that provides on-behalf customer relationship management services and the like. For example, the issuer bank may opt for services from the payment server 140 as an SMS gateway for handling financial messages of the customers and also hire a third-party CSC for resolving customer issues by way of calls/chats. The CSC includes various human agents and virtual agents to interact with customers and resolve their issues. The conversation is achieved via a call or a chat. The CSC server 115 includes Interactive Voice Response (IVR) system that receives the input and responses from the customer through spoken words with the voice recognition. Conversations are either pre-recorded or generated audio which assist, direct, or route calls automatically without a live operator and if the need be, connect with a live operator. Within these interactions, customers can communicate by using either the touch-tone keypad selection from their user devices or voice telephone input. The responses may take in the form of voice, call-back or any other related media. For the end user, these interactive systems function in a way that it allows him to navigate through the menu options and find an appropriate solution quickly, using only his phone's keypad.

The user device 102, the issuer server 135, the acquirer server 130, the merchant server 120, the payment server 140, the SMS gateway 105, the message application server 110, the wallet server 125 and the CSC server 115 communicate with one another using a communication network 150. Examples of the communication network 150 may include any type of wired network, wireless network, or a combination of wired and wireless networks. A wireless network may be a wireless local area network ("WLAN"), a wireless wide area network ("WWAN"), or any other type of wireless network now known or later developed. Additionally, the communication network 150 may be or include the Internet, intranets, extranets, microwave networks, satellite communications, cellular systems, personal communication services ("PCS"), infrared communications, global area networks, or other suitable networks, etc., or any combination of two or more such networks.

Upon receiving the one or more contexts of the message 104 from the payment server 140, the CSC server 115 assigns an appropriate agent for conversation with the user. The payment server 140 notifies the user by another message of the assignment of the agent for the sent context. Therefore, when the user calls the customer service number to connect with the agent, he is directed at the respective option from the menu of the IVR that is decided based on the context received in advance. In an embodiment, the user should call the customer service number within a stipulated time-period. Therefore, the CSC server 115 awaits an incoming call from the Registered Mobile Number (RIVIN) for a stipulated time period based on the time of the received context and a predefined time period. In an embodiment, an agent is pre-assigned for such upcoming calls with the context. This results in a lot of time-saving at the customer end, as he does not have to listen to the full menu options and provide multiple selections for filtering the options. Further, when the call is connected with the agent, the agent is already aware about the purpose of the call and hence, the conversation starts directly about how to resolve the issue rather then the user having to explain the whole issue from the beginning. Some non-exhaustive example embodiments of sending the one or more contexts of the message 104 to the CSC server 115 prior to an upcoming conversation with an agent are described with reference to the following description, particularly with reference to FIG. 2 to FIG. 15.

Figure 2:
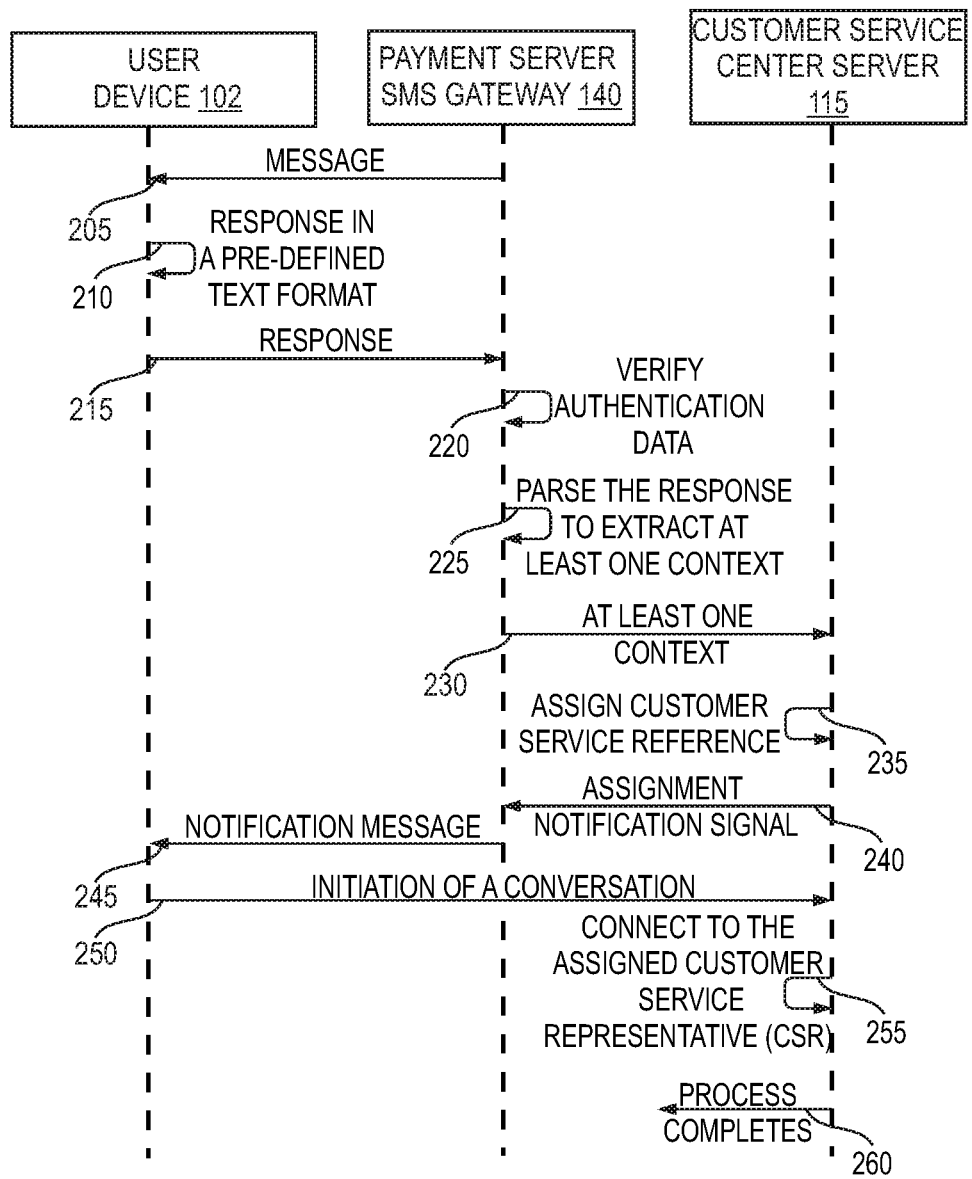
FIG. 2 is a sequence flow diagram representing receiving a response of a message from the user device for connecting with a customer service representative in a pre-defined text format, in accordance with an example embodiment.

FIG. 2 is a sequence flow diagram 200 representing receiving a response of a message from the user device for connecting with a customer service representative in a pre-defined text format, in accordance with an example embodiment. The message sent by the payment server 140 (an example of the server system) includes at least one option to receive a response of the message from the user device. An example of at least one option is a pre-defined text format, which is explained with reference to FIG. 2 hereinafter.

At 205, the payment server 140 sends a message related to a financial transaction to the user device 102. The message is an SMS text sent over cellular network via the SMS application 102a. The message includes additional text that provides an option to receive a response from the user device 102. For example, the message includes additional text as, 'type context xxx to send the context of this message to 9830450443 for connecting with our agent.'.

At 210, the user types a response in the pre-defined text format as mentioned in the message using the user device 102. For example, the response is 'context 543', 543 being last three digits of a payment card (e.g., a credit card) of the user that was used for processing a financial transaction mentioned in the message received from the payment server 140. The message may be sent by the payment server 140 on behalf of the issuer server 135 being card issuer of the payment card of the user. In an embodiment, the pre-defined message format could be any other keywords pre-defined by the issuer bank.

At 215, the payment server 140 receives the response from the user device 102 via the cellular network. The response is received from a registered mobile number of the user on which the original message was sent.

At 220, the payment server 140 verifies an authentication data. As the response is received from the registered mobile number of the user, the mobile number is used as the authentication data in this scenario and is verified against the user records stored in a database of the payment server 140. Alternatively, the payment server 140 extracts payment card number of the user and verifies that as the authentication data.

Upon successful verification of the authentication data, at 225, the payment server 140 parses the response to extract at least one context of the message. The payment server 140 includes one or more parsing algorithms to perform extraction of the contexts. For example, as the context includes last three digits of the payment card, the payment server 140 extracts full information associated with the payment card of the user such as, the card number, expiry date, transaction history, CVV and the like. In an example embodiment, the extracted information is corelated to the sent message to determine one or more contexts of the message. For example, the user wishes to talk about an approaching expiry date of the payment card (which may not be necessarily related to the recent transaction performed using the card).

At 230, the payment server 140 sends at least one context determined based on applied logics to the CSC server 115.

At 235, the CSC server 115 assigns a customer service representative based on the context. For example, an agent handling all the payment card related queries is assigned, and the context along with the original message is sent to his computing device for an expected upcoming conversation from the user. In one example embodiment, the agent may be a human agent that is connected with the user through an IVR system. Alternatively, the agent may be a chatbot that chats with the user when connected via a web link. The virtual agent may be trained to help the user solve the payment card related query. In another example embodiment, it may be possible that a virtual agent is temporarily assigned to the user based on the context and later when a human agent is available, the virtual agent may notify in the chat about availability of the human agent if the user wants to directly talk with the human agent via a voice call. In such a case, the user may not have to go through the IVR system when he calls a given number, and he may be enabled to have a direct conversation with the assigned agent for the issue.

Upon assignment, at 240, the CSC server 115 sends an assignment notification signal to the payment server 140 about the agent being assigned based on the context. The assignment notification signal also includes various communication ways using which the assigned agent may be contacted/connected.

At 245, the payment server 140 sends a notification message to the user device 102 via the SMS application 102a. The notification message may include agent details, the calling numbers using which the human agent can be connected via a voice call (if a human agent is assigned), a web link using which a virtual agent can be connected (if a virtual agent is assigned), a pre-determined time limit for connecting with the agent and the like.

At 250, the user initiates a conversation using the user device 102 by way of a normal voice call or a chat using the web link provided in the notification message. In an example, when the user calls the number through the registered mobile number, the user may directly be jumped to an option in the IVR menu which is best suited for the context received. In this example, a pointer is associated to the best suited IVR option for the registered mobile number for the predefined time period. Therefore, when the user calls the CSC for the query within the predefined time period, post sending the context, the IVR menu option that is best suited for handling that query is heard by the user. The user then proceeds by selecting appropriate option on the IVR menu and the pre-assigned agent is connected for the call. However, if the user selects a different option in the IVR menu then the corresponding feedback is sent to the CSC server 115 and another agent based on the selected option of the IVR menu is assigned in runtime. For example, the user dials the contact number of the customer service centre. As the context is already known, the user is directly provided with a selection number related to the payment card option by the IVR system. User provides the selection number using the keypad of the user device 102. The selection number is received by the CSC server 115 over the cellular network.

At 255, the CSC server 115 connects the assigned agent to the user. The received selection number is used to connect the assigned agent to the user. Alternatively, the user is enabled to provide a voice input about the selected number. The CSC server 115 interprets the voice input to connect the assigned agent to the user. As the assigned agent already has the payment card details received from the payment server 140 via the CSC server 115 on his computing device, the user is not needed to explain the purpose of the conversation again to the agent. Also, as the user is pre-authenticated by the payment server 140 using the registered mobile number, the agent skips the authentication process as well to directly jump to resolving the issue. Once the issue is resolved by the agent, the conversation is ended and the process competes at operation 260.

Figure 3A:
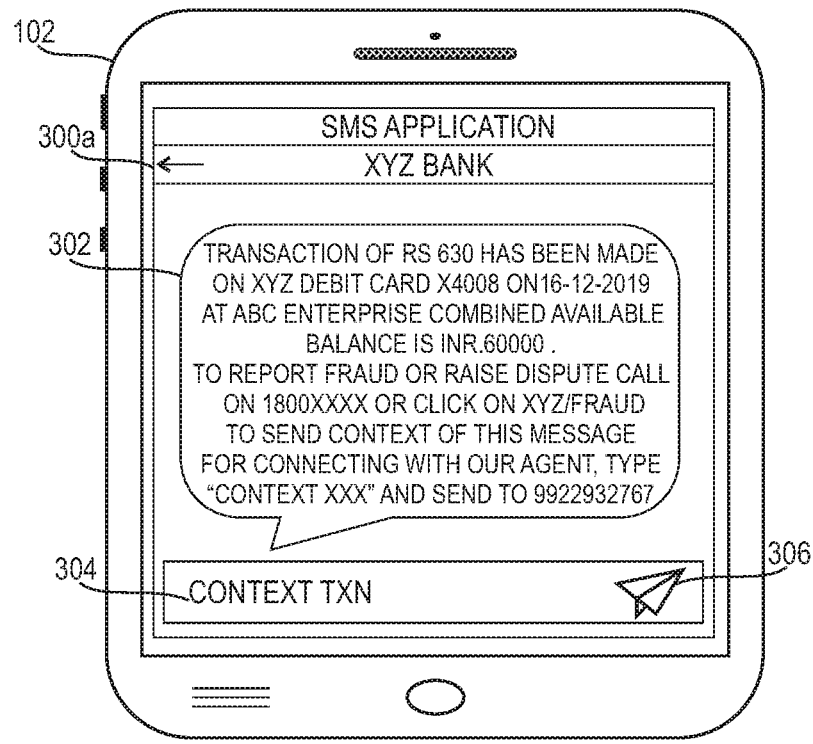
FIGS. 3A and 3B, collectively, represent corresponding User Interfaces (UIs) for sending the response in the pre-defined text format for connecting with the customer service representative, in accordance with an example embodiment.
Figure 3B:
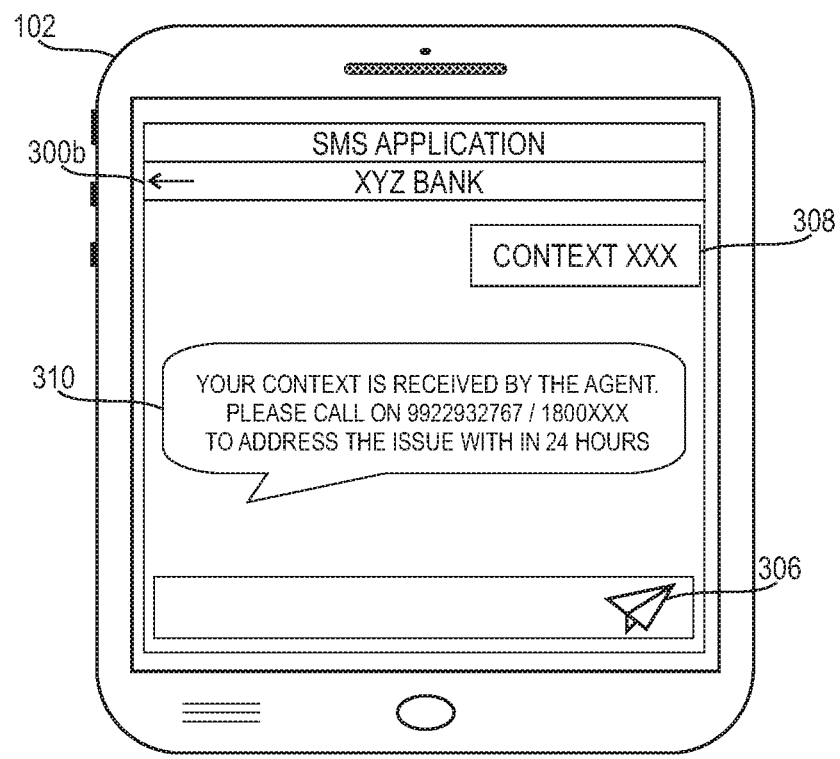

FIGS. 3A and 3B, collectively, represent corresponding User Interfaces (UIs) 300A and 300B for sending a response in a pre-defined text format for connecting with a customer service representative, in accordance with an example embodiment. More specifically, FIG. 3A represents a UI 300A displayed by the SMS application 102a on the user device 102 (e.g., a smartphone). The UI 300A includes a message 302 displaying text 'Transaction of Rs. 630 has been made on XYZ debit card x4008 on Dec. 12, 2019 at ABC enterprise. Combined available balance is INR 60,000. To report fraud or raise dispute call on 1800xxxx or click xyz/fraud. To send a context of this message for connecting with our agent, type 'context xxx' and send to 9820120120.'. The message 104 of the FIG. 1 is customized by the payment server 140 to create the message 302 that includes an option to receive a response of the message 104 in the form of a pre-defined text.

The UI 300A also includes a form field 304 using which the user has typed 'context TXN' as a response to be sent using a clickable send icon 306. The 'context TXN' implies to be a context related to the transaction about which the message 302 is received. For example, the user did not perform the mentioned transaction and wishes to connect with an agent immediately to report a fraud. In such a situation, instead of calling on given numbers in the message, if the user opts to send a context of the message first, then he is directly connected to a respective agent at the time of calling as explained with reference to FIG. 2. This results in faster issue resolving.

FIG. 3B represents a UI 300B displayed by the SMS application 102a on the user device 102. The UI 300B includes conversation messages between the user and the payment server 140. A response 308 sent by the user using the form field 304 of the UI 300A is displayed as, 'context TXN'. As explained with reference to FIG. 2, the payment server 140 verifies the mobile number from which the response has been received as an authentication data. Thereafter, the response is parsed to extract the context. Here, the context is about the transaction. Therefore, the payment server 140 retrieves all the transaction information such as, debit card information, issuer information of the debit card, the user records, transaction history of the debit card, etc. The payment server 140 sends all this information along with the original message as a context to the CSC server 115 for agent assignment. The CSC server 115 assigns the agent based on the context and notifies the payment server 140 via an assignment notification signal.

The payment server 140 is configured to send a notification message 310 as displayed on the UI 300B. The notification message 310 displays text, 'your context is received by the agent. Please call on 9922932767/18000XXX within 24 hours to address this issue.'. It means that a human agent is assigned to address the transaction related context sent by the user. In an embodiment, periodic updates/notifications can also be sent to the user on the RMN. For example, the user receives a "SMS delivered" notification when the agent is assigned for the issue. In another example, an additional message is sent to the user. Therefore, when the user calls on one of the given numbers in the notification message 310, the user is directed to an option related to transactions for connecting with an agent for user selection by the IVR system. As the CSC server 115 receives the user selection from the user device 102, the assigned agent is connected to have verbal conversation with the user. As the user is pre-authenticated, he starts the conversation directly about informing the agent that he did not perform the transaction mentioned in the message 302 and the agent blocks the debit card as an immediate action for preventing future fraud. Thus, not only the user's time is saved by this feature, the agent is also better enabled to solve the user query faster. This leads to serving more customers by the agent so that he can earn more professional rewards and the enterprise can gain commercial benefits from greater user satisfaction.

In one example embodiment, the user is enabled to send more than one context as a response to the message 302. For example, apart from the response 308, if the user wishes to connect with the agent about a query related to the available balance in the account, the user is enabled to send one more response, such as 'context BAL' to the given number. For such a scenario, where the payment server 140 receives more than one response for the same message 302, the payment server 140 retrieves both the contexts, and sends both the contexts to the CSC server 115 for agent assignment. If the contexts are corelated and can be resolved by the same agent, then only one agent is assigned by the CSC server 115. If the contexts are not corelated, different agents may be assigned and when the first issue is resolved, the call may be transferred to another assigned agent for resolving the second issue.

Figure 4:
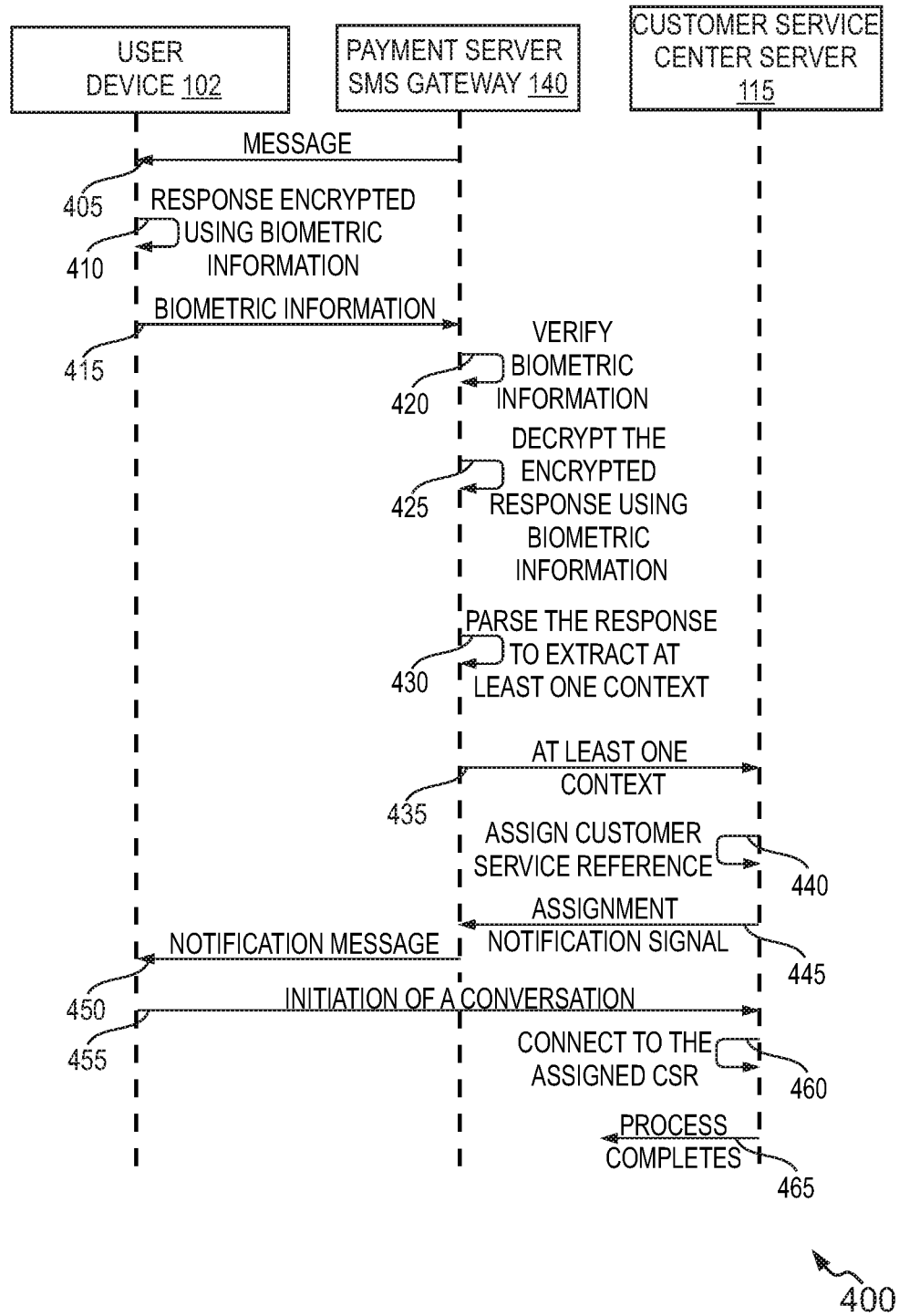
FIG. 4 is a sequence flow diagram representing receiving a response of the message encrypted using a biometric information from the user device for connecting with the customer service representative, in accordance with an example embodiment.

FIG. 4 is a sequence flow diagram 400 representing receiving a response of a message encrypted using a biometric information from the user device for connecting with a customer service representative, in accordance with an example embodiment. The message sent by the payment server 140 includes at least one option to receive a response of the message from the user device. The at least one option being receiving the response encrypted using a biometric information is explained with reference to FIG. 4 hereinafter.

At 405, the payment server 140 sends a message related to a financial transaction to the user device 102. The message is an SMS text sent over cellular network via the SMS application 102a. The message includes additional text that provides an option to receive a response from the user device 102. For example, the message is related to reward points earned by the user for a recent purchase using a specific credit card (an example of a payment card of the user) at a partner enterprise. The message includes additional text as, 'press and hold the message to send the context of your message.'. This results in receiving fingerprint of the user. It is noted that the user needs to provide a fingerprint or other forms of biometric information such as a face recognition or iris scan at the time of registration with the payment server 140 for opting the context-based SMS services. The biometric information can be provided by an application facilitated by the payment server 140 at the time of registration.

At 410, the user presses and holds the message with his pre-registered finger on the user device 102 to send a response of the message encrypted using the biometric information.

At 415, the biometric information is received by the payment server 140 from the user device 102 via the cellular network. The biometric information includes the response.

At 420, the payment server 140 verifies the biometric information as an authentication data. As the payment server 140 already has a pre-stored biometric information of the user, the received biometric information is matched with the pre-stored biometric information for performing pre-authentication of the user.

Upon successful verification of the biometric information, at 425, the payment server 140 decrypts the encrypted response using the biometric information. At 430, the payment server 140 parses the response to extract at least one context of the message. For example, the context of the message is about reward points.

At 435, the payment server 140 sends at least one context to the CSC server 115.

At 440, the CSC server 115 assigns a customer service representative based on the context. For example, an agent handling all the reward points related queries is assigned and the context along with the original message is sent to his computing device for an expected upcoming conversation from the user.

Upon assignment, at 445, the CSC server 115 sends an assignment notification signal to the payment server 140 about the agent being assigned based on the context.

At 450, the payment server 140 sends a notification message to the user device 102 via the SMS application 102a. The notification message may include agent details, the numbers using which the human agent can be connected via a voice call, a pre-determined time limit for connecting with the agent and the like.

At 455, the user initiates a conversation using the user device 102 by way of a voice call provided in the notification message. For example, the user dials the contact number of the customer service centre. As the context is already known, the user is directly provided with the reward points option selection number by the IVR system. User provides the selection number using the keypad of the user device 102. The selection number is received by the CSC server 115 over the cellular network.

At 460, the CSC server 115 connects the assigned agent to the user. The receipt of the selection number is used to connect the assigned agent to the user. Alternatively, when the user initiates a conversation using the user device 102 by way of a voice call, the CSC server 115 automatically connects the user to the assigned agent, by skipping the IVR system altogether. The decision to directly connect the user with the assigned agent may be taken for a privileged customer by the CSC server 115. As the assigned agent already has the context received from the payment server 140 via the CSC server 115 on his computing device, the user does not need to explain in detail the purpose of the conversation. Also, as the user is pre-authenticated by the payment server 140 using the biometric information, the agent skips the authentication process as well to directly jump to resolving the issue. Once the issue is resolved by the agent, the conversation is ended and the process competes at operation 465.

Figure 5A:
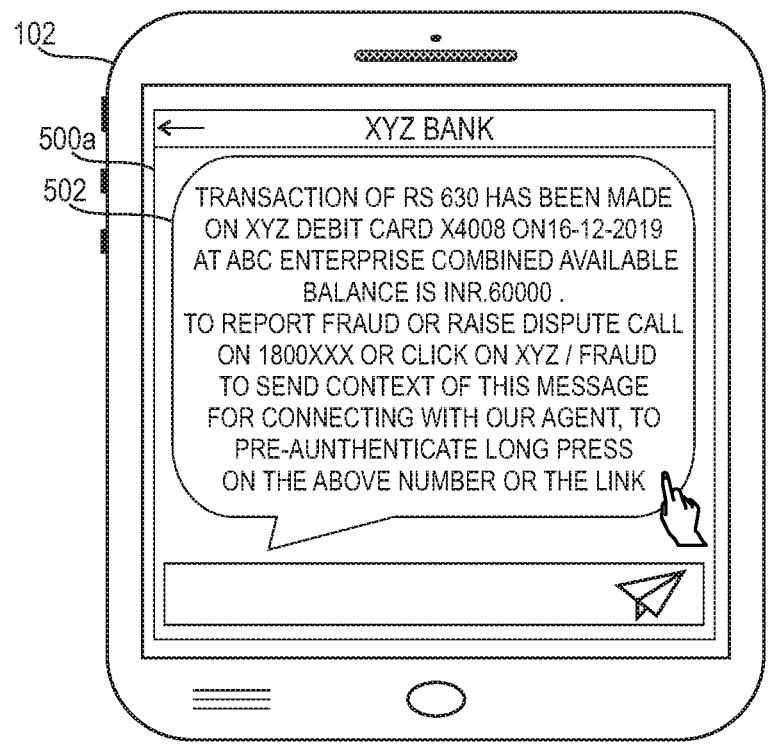
FIGS. 5A and 5B, collectively, represent corresponding UIs for sending the response encrypted using the biometric information for connecting with the customer service representative, in accordance with an example embodiment.
Figure 5B:
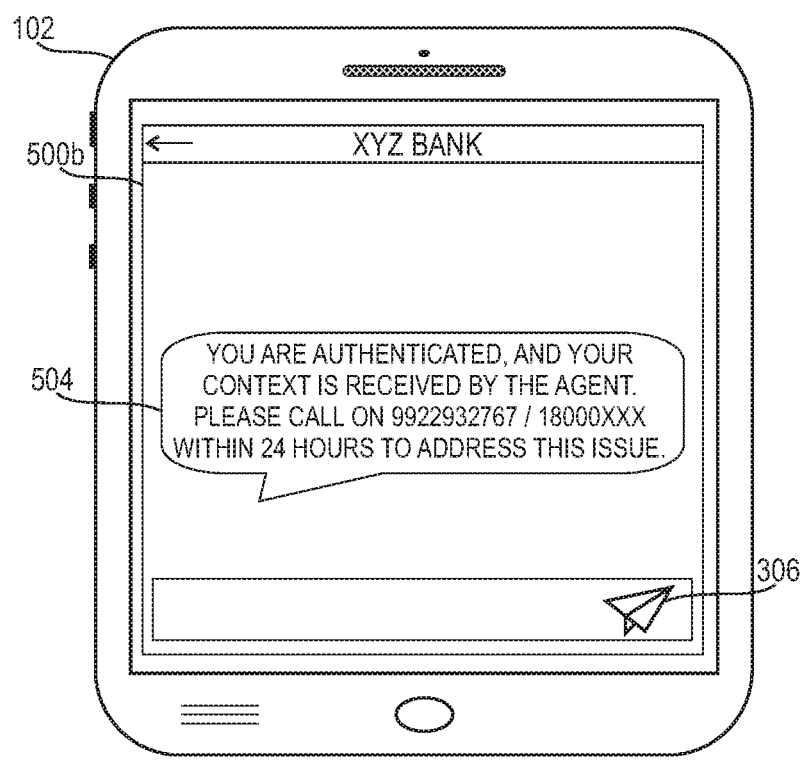

FIGS. 5A and 5B, collectively, represent corresponding User Interfaces (UIs) 500A and 500B for sending a response encrypted using a biometric information for connecting with a customer service representative, in accordance with an example embodiment. More specifically, FIG. 5A represents a UI 500A displayed by the SMS application 102a on the user device 102. The UI 500A includes a message 502 displaying text 'Transaction of Rs. 630 has been made on XYZ debit card x4008 on Dec. 16, 2019 at ABC enterprise. Combined available balance is INR To report fraud or raise dispute call on 1800xxxx or click xyz/fraud. To send a context of this message for connecting with our agent and to pre-authenticate, long press the above number or the link.'. The message 104 of the FIG. 1 is customized by the payment server 140 to create the message 502 that includes an option to receive a response of the message 104 encrypted using a biometric information. The number is shown to be long pressed by the user using a registered fingerprint in the UI 500A. This results in encryption of the whole message 502 under the scanned fingerprint of the user. The SMS application 102a sends the biometric information to the payment server 140.

As explained with reference to FIG. 4, the biometric information/the fingerprint data is verified and decrypted thereafter to retrieve the response by the payment server 140. As the message 502 is accompanied as a response under the biometric information, the payment server 140 sends the message 502 to the CSC server 115 as a context of the message 502. In such a scenario, the payment server 140 determines one or more contexts (e.g., account balance and transaction amount) of the message 502 itself and sends them along with the actual message 502 to the CSC server 115. Based on agent availability, the CSC server 115 selects one of the contexts and assigns that to a respective agent. The CSC server 115 assigns the agent based on the selected context and notifies the payment server 140 via an assignment notification signal.

FIG. 5B represents a UI 500B displayed by the SMS application 102a on the user device 102. The payment server 140 is configured to send a notification message 504 about agent assignment as displayed on the UI 500B. The notification message 504 displays text, 'you are authenticated, and your context is received by the agent. Please call on 9922932767/18000XXX within 24 hours to address this issue.'. It means that a human agent is assigned to address a selected context. For example, the account balance is selected by the CSC server 115 and the assigned agent is capable of resolving account balance related query. The context and the message 502 are already available with the assigned agent. Therefore, when the user calls on one of the given numbers in the notification message 504, the user is directed to an option for connecting with the assigned agent for account balance related issues for user selection. As the CSC server 115 receives the user selection, the assigned agent is connected to have verbal conversation with the user. As the user is pre-authenticated, he starts the conversation directly about account balance query. Once a current query is resolved, the assigned agent may direct the call to another assigned agent for resolving query related to the transaction amount. Thus, along with time-saving, the user is enabled to resolve more than one issues during the same call as more than one contexts are already sent in advance to respective agents.

Figure 6:
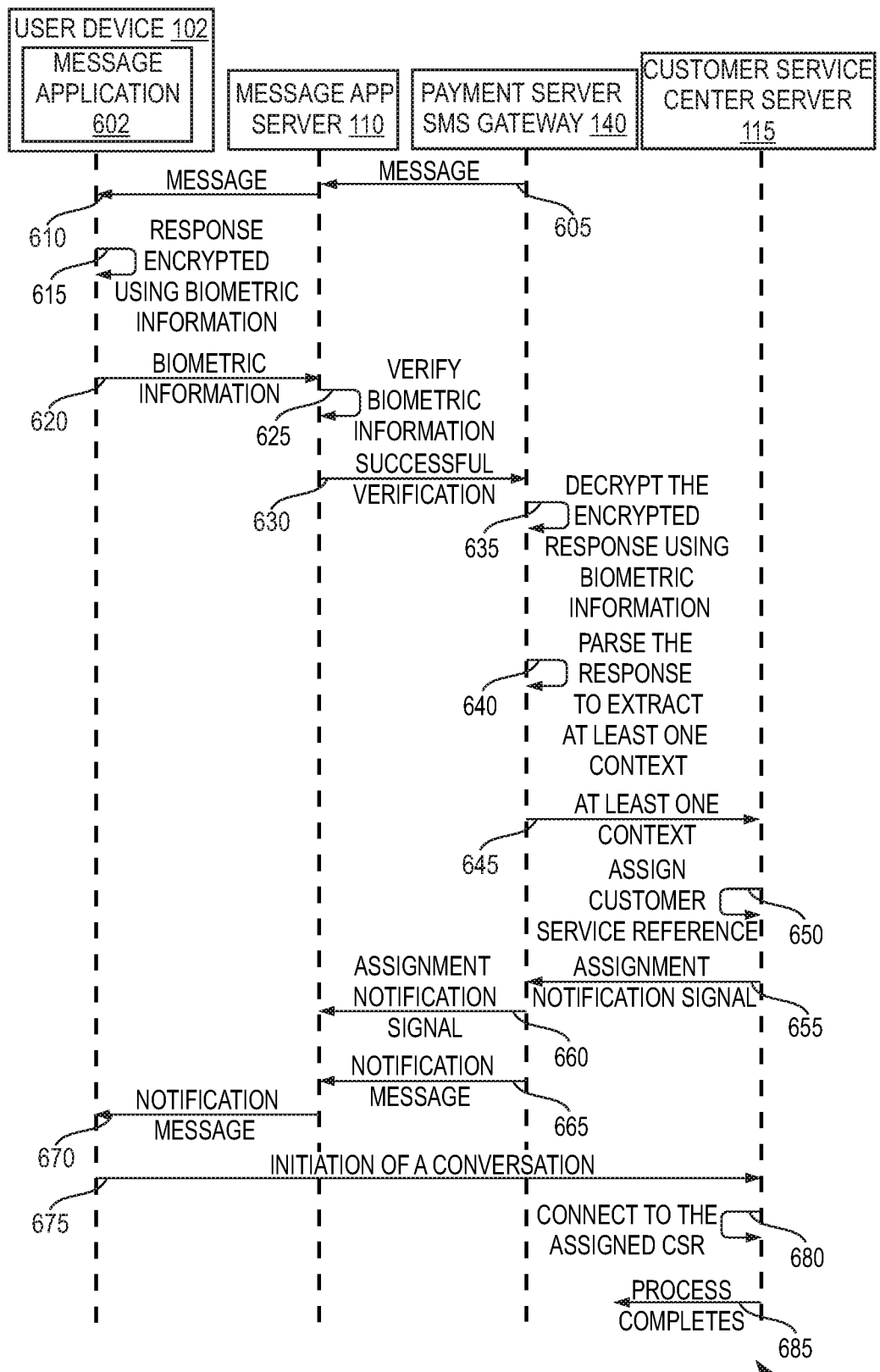
FIG. 6 is a sequence flow diagram representing receiving a response of the message encrypted using the biometric information from the user device for connecting with the customer service representative, in accordance with another example embodiment.

FIG. 6 is a sequence flow diagram 600 representing receiving a response of a message encrypted using a biometric information from the user device for connecting with a customer service representative, in accordance with another example embodiment. The message is sent by the payment server 140 using a message application 602 facilitated by the message application server 110.

At 605, the payment server 140 sends a message related to a financial transaction to the message application server 110.

At 610, the message application server 110 sends the message to the user device 102 via the message application 602. The message is a data message sent over internet. The message includes additional text as, 'press and hold the message to send the context of your message.'. This results in receiving fingerprint of the user via the message application 602. It is noted that the user needs to provide the biometric information at the time of registration with the payment server 140 for opting the context-based SMS services. The biometric information can be provided by an application facilitated by the payment server 140 at the time of registration or using the message application 602.

At 615, the user presses and holds the message with his pre-registered finger on the user device 102 to send a response of the message encrypted using the biometric information via the message application 602 running on the user device 102.

At 620, the biometric information is received by the message application server 110 from the user device 102 via internet. The biometric information includes the response as explained with reference to FIG. 4.

At 625, the message application server 110 verifies the biometric information if the biometric information has been registered through the message application 602. Alternatively, the biometric information is sent to the payment server 140. The payment server 140 verifies the biometric information as an authentication data.

Upon successful verification of the biometric information, at 630, the message application server 110 sends a successful verification notification signal to the payment server 140.

At 635, the payment server 140 decrypts the encrypted response using the biometric information. At 640, the payment server 140 parses the response to extract at least one context of the message. At 645, the payment server 140 sends at least one context to the CSC server 115. At 650, the CSC server 115 assigns a customer service representative based on the context.

At 655, the CSC server 115 sends an assignment notification signal to the payment server 140 about the agent being assigned based on the context. At 660, the payment server 140 forwards the assignment notification signal to the message application server 110 about the agent being assigned based on the context.

At 665, the payment server 140 sends a notification message to the message application server 110. The notification message includes a pre-determined time limit for connecting with the agent along with the details of type of the agent assigned. At 670, the message application server 110 sends the notification message to the user device 102 via the message application 602.

At 675, the user initiates a conversation using the user device 102. The conversation may be achieved by way of a voice call over cellular network or a chat with a virtual agent using the message application 602. Alternatively, the user is enabled to initiate a voice call or a video call or a text chat via internet using the message application 602. In such a scenario, the message application server 110 routes the call to the CSC server 115. The CSC server 115 facilitates user selection of an option determined based on the context through IVR system. User provides the selection number using the keypad of the user device 102. The selection number is received by the CSC server 115 over the communication network.

At 680, the CSC server 115 connects the assigned agent to the user. The receipt of the selection number is used to connect the assigned agent to the user. Once the issue is resolved by the agent, the conversation is ended, and the process competes at operation 685.

Figure 7:
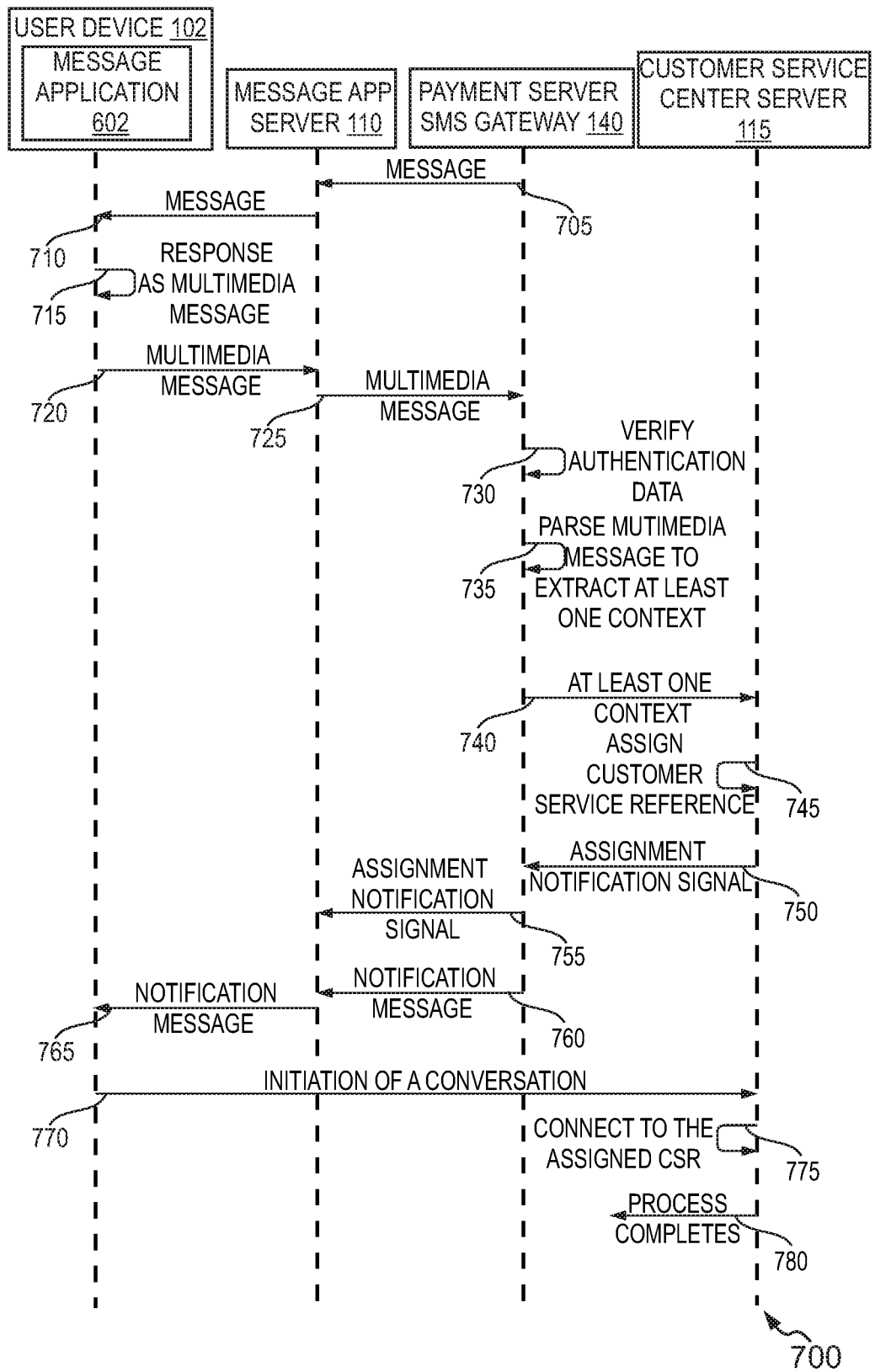
FIG. 7 is a sequence flow diagram representing receiving a response of the message as a multimedia message from the user device for connecting with the customer service representative, in accordance with an example embodiment.

FIG. 7 is a sequence flow diagram 700 representing receiving a response of a message as a multimedia message from the user device for connecting with a customer service representative, in accordance with an example embodiment.

At 705, the payment server 140 sends a message related to a financial transaction to the message application server 110.

At 710, the message application server 110 sends the message to the user device 102 via the message application 602 over internet. The message includes additional text as, 'reply to the message to send the context of your message'. The message application 602 provides various features for sending response of the message. For example, the user sends a voice note/voice message recorded using the message application 602. Alternatively, the user is enabled to send a video or an image as the response of the message.

At 715, a response of the message, as a multimedia message via the message application 602, is sent from the user device 102 to the message application server 110. At 720, the message application server 110 sends the multimedia message/voice message to the payment server 140.

At 725, the payment server 140 verifies an authentication data. For example, the payment server 140 is configured to verify the voice of the user as a user authentication data using one or more voice analysis algorithms and voice recognition algorithms.

Upon successful verification of the authentication data, at 730, the payment server 140 parses the multimedia message to extract at least one context of the message. At 735, the payment server 140 sends at least one context to the CSC server 115. At 740, the CSC server 115 assigns a customer service representative based on the context.

Upon assignment, at 745, the CSC server 115 sends an assignment notification signal to the payment server 140 about the agent being assigned based on the context. At 750, the payment server 140 forwards the assignment notification signal to the message application server 110.

At 755, the payment server 140 sends a notification message to the message application server 110. The notification message includes a pre-determined time limit for connecting with the agent. At 760, the message application server 110 sends the notification message to the user device 102 via the message application 602.

At 765, the user initiates a conversation using the user device 102. The conversation may be achieved by way of a voice call over cellular network or a chat with a virtual agent using the message application 602. Alternatively, the user is enabled to initiate a voice call or a video call via internet using the message application 602 as explained with reference to FIG. 6 hereinabove.

At 770, the CSC server 115 connects the assigned agent to the user. Once the issue is resolved by the agent, the conversation is ended, and the process competes at operation 775.

Figure 8A:
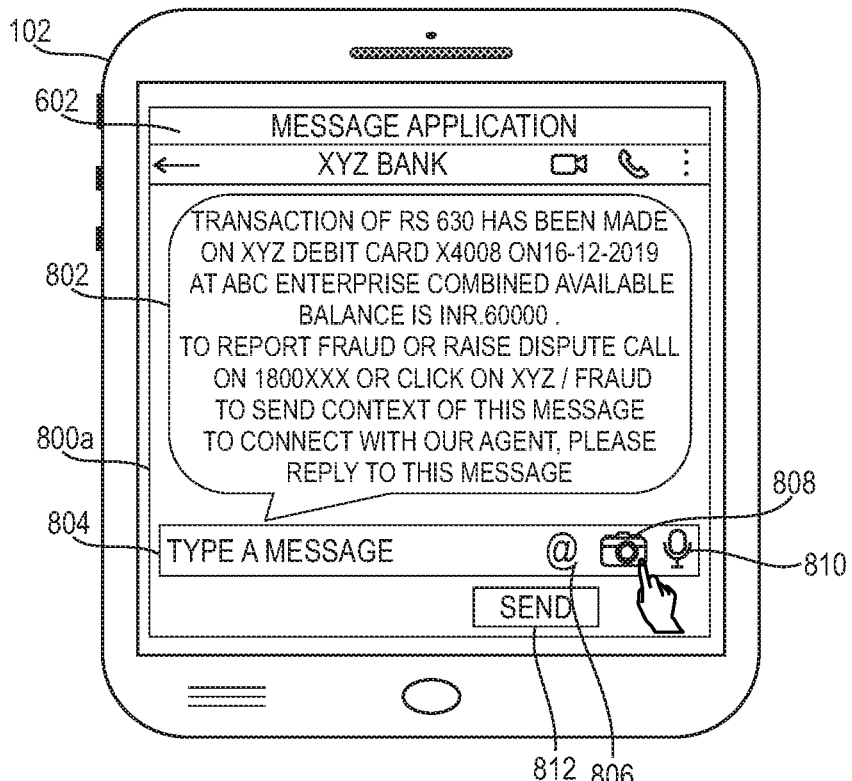
FIGS. 8A and 8B, collectively, represent corresponding UIs for sending the response as the multimedia message for connecting with the customer service representative, in accordance with an example embodiment.
Figure 8B:
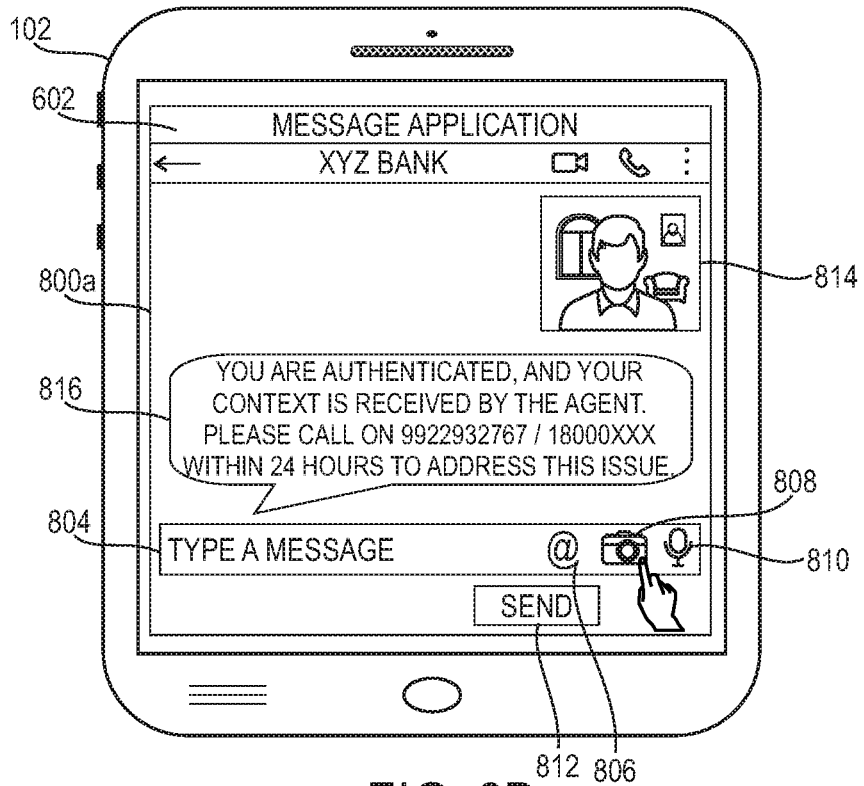

FIGS. 8A and 8B, collectively, represent corresponding User Interfaces (UIs) 800A and 800B for sending a response as a multimedia message for connecting with a customer service representative, in accordance with an example embodiment. More specifically, FIG. 8A represents a UI 800A displayed by the message application 602 on the user device 102 (e.g., a smartphone). The UI 800A includes a message 802 displaying text, 'Transaction of Rs. 630 has been made on XYZ debit card x4008 on Dec. 12, 2019 at ABC enterprise. Combined available balance is INR 60,000. To report fraud or raise dispute call on 1800xxxx or click xyz/fraud. To send a context of this message for connecting with our agent, please reply to this message.'. The message 104 of the FIG. 1 is customized by the payment server 140 to create the message 802 that includes an option to receive a response of the message 104 in a multimedia format. For example, the user is at his home and checks the message 802 immediately when it is received. It means that the user is not present at the ABC enterprise as mentioned in the message and therefore, he wants to repot this transaction as fraud.

The UI 800A also includes a form field 804 using which the user can type a response if he wishes to send the response as a text message. Additionally, the form field 804 includes various selectable icons such as an attachment icon 806, a camera icon 808, a microphone icon 810 and the like. The camera icon 808 is shown to be selected by the user to initiate a camera application to click an image for sending as a response. Instead of typing the response, the user clicks his own image with his house in background using the camera application (not shown) and clicks a button 812 labeled 'send' to send the response as an image with the inbuilt geo location tags.

FIG. 8B represents a UI 800B displayed by the message application 602 on the user device 102. The UI 800B includes conversation messages between the user and the message application server 110. The message 802, and a response 814, in the form of an image, are shown. As explained with reference to FIG. 7, the message application server 110 sends the response 814 to the payment server 140 for verification of the authentication data. The payment server 140 uses one or more image processing algorithms, image analysis algorithm and face recognition algorithms to verify the user identity from the image. Thereafter, the response is parsed to extract the context. For example, the payment server 140 is configured to compare the response/image with the contents of the message 802 and determine the context to be about reporting the transaction as fraud. Therefore, the payment server 140 retrieves all the transaction information such as, debit card information, issuer information of the debit card, the user records, transaction history of the debit card etc.

The payment server 140 sends all this information along with the original message 802 as a context to the CSC server 115 for agent assignment. The CSC server 115 assigns the agent based on the context and notifies the payment server 140 via an assignment notification signal. The payment server 140 sends the assignment notification signal to the message application server 110. The payment server 140 is also configured to send a notification message 816 as displayed on the UI 800B via the message application server 110. The notification message 816 displays text, 'you are authenticated and your context is received by the agent. Please call on 9922932767/18000XXX within 24 hours to address this issue.'. When the user calls on one of the given numbers, the assigned agent resolves the issue as explained with the foregoing figures hereinabove.

In another example, if the user has done an ATM/POS transaction and have a query related to that transaction, then the user may click a picture of the ATM/POS machine along with the geo location of the place and send it as multimedia response via the message application 602. The context is extracted using one or more of the RMN, the geo-location of the image, the recent transaction performed by the payment card associated with RMN, the POS terminal, the merchant, the ATM and the like. For example, if a user performed a financial transaction at an ATM and have a query regarding the transaction, then the user can click an image of the ATM along with the geo location tag and send it as a response in a multimedia message. The context is extracted by identifying various information from the multimedia message like identifying a payment card number associated with the RMN, the transactions done by the payment card, ATM machine identified through the geo location and the like. Such information is further analyze the context and assign an agent.

Figure 9:
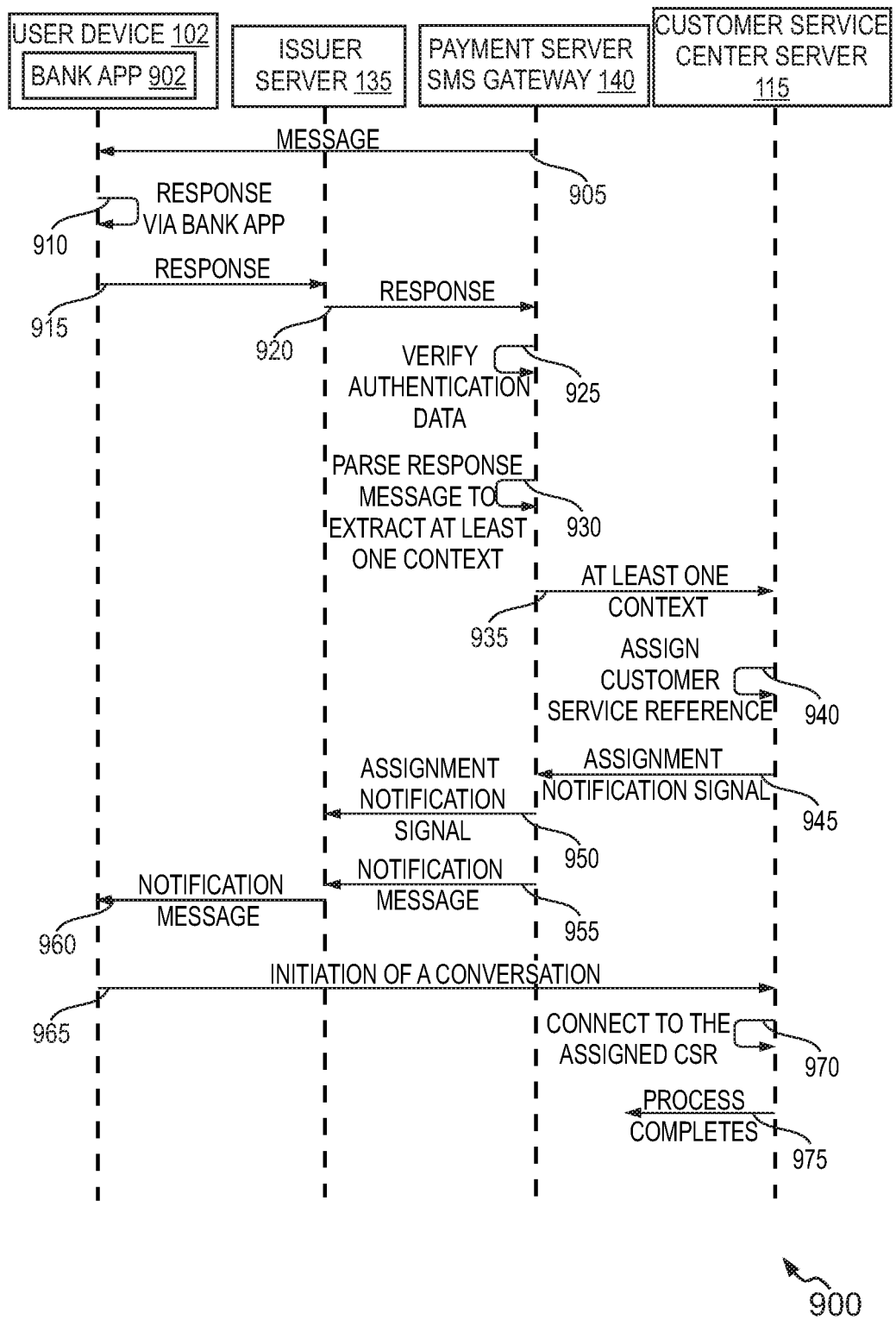
FIG. 9 is a sequence flow diagram representing receiving a response of the message via a bank application from the user device for connecting with the customer service representative, in accordance with an example embodiment.

FIG. 9 is a sequence flow diagram 900 representing receiving a response of a message as via a bank application from the user device for connecting with a customer service representative, in accordance with an example embodiment.

At 905, the payment server 140 sends a message to the user device 102 over a cellular network via the SMS application 102a on behalf of an issuer bank. The message is related to a financial transaction. The message includes additional text as, 'to send the context of your message use your bank application'. In one example embodiment, the issuer bank facilitates a bank application 902 via the issuer server 135 that runs on the user device 102. The bank application 902 facilitates online transactions, net banking, mobile banking, tokenization etc.

At 910, a response of the message is provided by the user using the bank application 902 running on the user device 102. The bank application 902 also provides various features (similar to the message application 602) for sending response of the message received from the payment server 140 working as an SMS gateway. To send a response, the user accesses the bank application 902 installed on the user device 102. For example, the user may type 'context RWD' using a UI of the bank application 902 and send it to the bank application 902. Or the user may simply write a text message as a response. In at least one embodiment, the user is enabled to copy the message from the SMS application 102a and paste it on a corresponding UI of the bank application 902 for sending the response.

At 915, the bank application 902 sends the response to the issuer server 135. At 920, the response is forwarded to the payment server 140 by the issuer server 135. At 925, the payment server 140 verifies an authentication data.

Upon successful verification of the authentication data, at 930, the payment server 140 parses the response to extract at least one context of the message. At 935, the payment server 140 sends at least one context to the CSC server 115. At 940, the CSC server 115 assigns a customer service representative based on the context.

At 945, the CSC server 115 sends an assignment notification signal to the payment server 140. At 950, the payment server 140 forwards the assignment notification signal to the issuer server 135. At 955, the payment server 140 sends a notification message to the issuer server 135. At 960, the issuer server 135 sends the notification message to the user device 102 via the bank application 902.

At 965, the user initiates a conversation using the user device 102. The conversation may be achieved by way of a voice call over cellular network or a chat with a virtual agent using the web link. At 970, the CSC server 115 connects the assigned agent to the user based on the mode of communication initiated by the user. Once the user issue is resolved by the agent, the conversation is ended, and the process competes at operation 975.

Figure 10A:
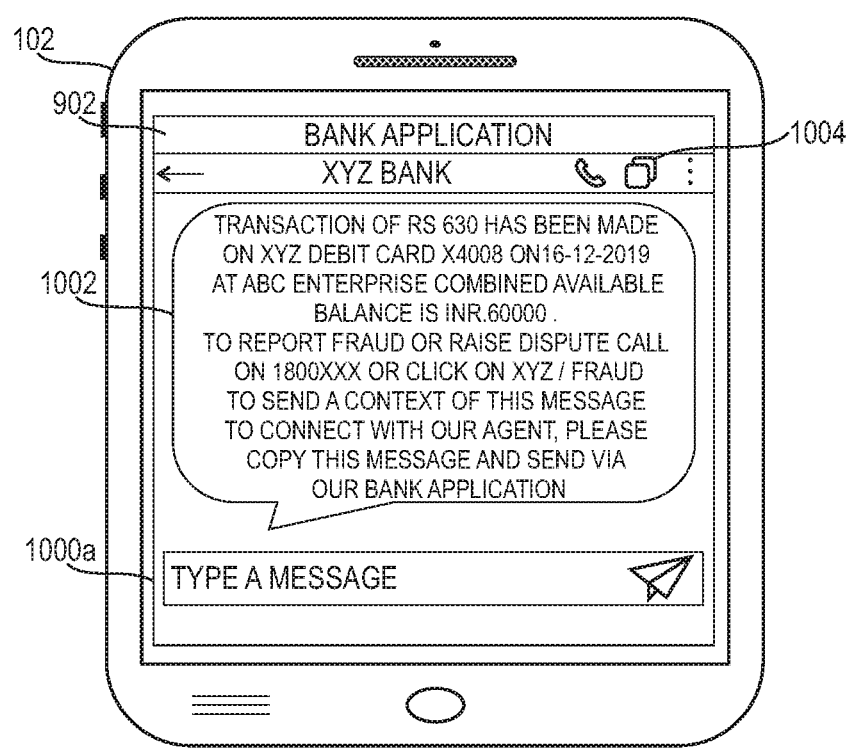
FIGS. 10A and 10B, collectively, represent corresponding UIs for sending the response via the bank application for connecting with the customer service representative, in accordance with an example embodiment.
Figure 10B:
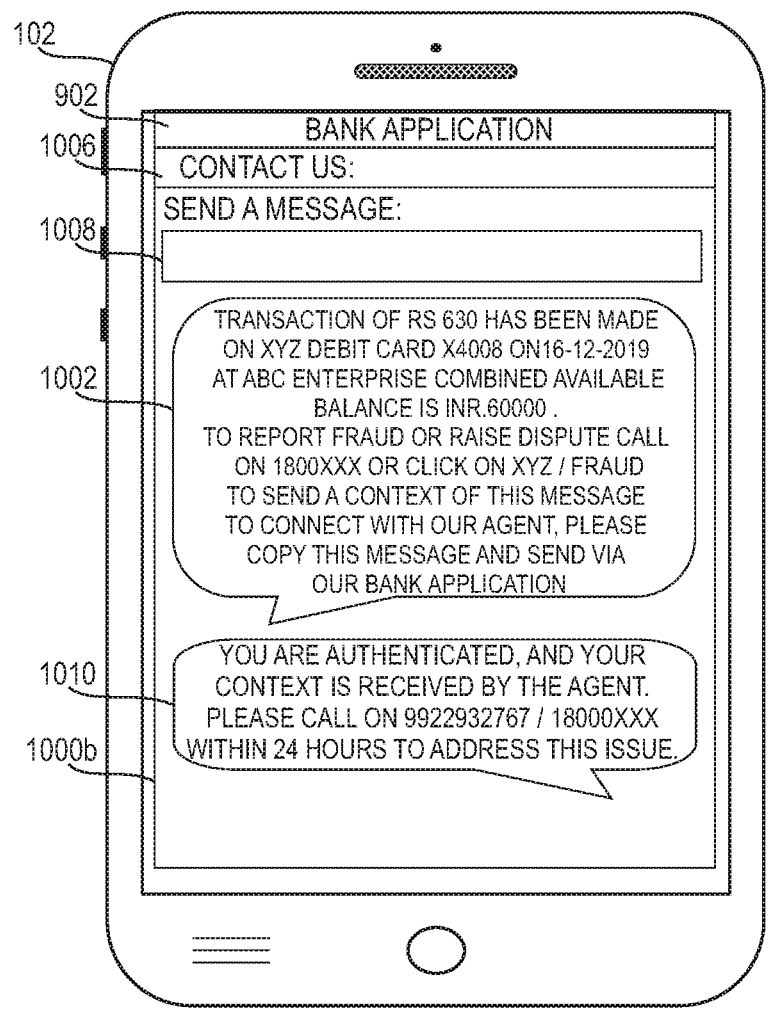

FIGS. 10A and 10B, collectively, represent corresponding UIs 1000A and 1000B for sending a response using a bank application for connecting with a customer service representative, in accordance with an example embodiment. More specifically, FIG. 10A represents a UI 1000A displayed by the SMS application 102a on the user device 102. The UI 1000A includes a message 1002 displaying text, 'Transaction of Rs. 630 has been made on XYZ debit card x4008 on Dec. 12, 2019 at ABC enterprise. Combined available balance is INR 60,000. To report fraud or raise dispute call on 1800xxxx or click xyz/fraud. To send a context of this message for connecting with our agent, please copy this message and send via our bank application.'. The message 104 of the FIG. 1 is customized by the payment server 140 to create the message 1002 that includes an option to receive a response of the message 104 via the bank application 902. The UI 1000A also includes one or more selectable icons such as a copy icon 1004. The user can copy the message using the copy icon 1004 and paste at a desirable location on a UI.

FIG. 10B represents a UI 1000B displayed by the bank application 902 facilitated by the issuer server 135 of FIG. 1 on the user device 102. The UI 1000B includes a header 1006 displaying text, 'contact us:' A sub-header 1008 displaying text, 'send a message:' is shown under which the message 1002 is displayed using the paste function. The issuer server 135 receives the message 1002 as pasted by the user using the UI 1000B of the bank application 902. Alternatively, the bank application 902 may facilitate various options (e.g., an image, a voice, a video along with geo-location tags) to send the response as a multimedia message as explained hereinabove with reference to FIGS. 8A and 8B. The message 1002 is considered as a response from which the payment server 140 needs to extract the context. As explained with reference to FIG. 4, when the whole message is received by the payment server 140 as a response, the payment server 140 is configured to analyse the message 1002 and extract one or more contexts on its own. These contexts along with the original message 1002 are sent to the CSC server 115 for agent assignment after preforming pre-authentication of the user. Alternatively, when the user calls, the assigned agent performs user authentication and then resolves the issue using the known contexts. The payment server 140, via the issuer server 135, is configured to send a notification message 1010 as displayed on the UI 1000B. The notification message 1010 displays text, 'you are authenticated and your context is received by the agent. Please call on 9922932767/ 18000XXX within 24 hours to address this issue.'. When the user calls on one of the given numbers, the assigned agent resolves the issue as explained with the foregoing figures hereinabove. It is noted that the pre-defined time limit for connecting with the assigned agent may vary based on the context, agent's availability etc.

Thus, various embodiments of the present disclosure provide various means to send a response of the message via a pre-defined text, a biometric information, a multimedia text format, a third-party application and the like such that the user does not have to stick to one established method of sending the response that includes one or more underlying contexts. Further, various embodiments also provide various means to connect with the assigned agent of the CSC via a call over a cellular network, a chat with a virtual agent, a voice call over internet, a video call over internet, a text chat over internet and the like, which further widens the scope of connecting with the agent.

Figure 11:
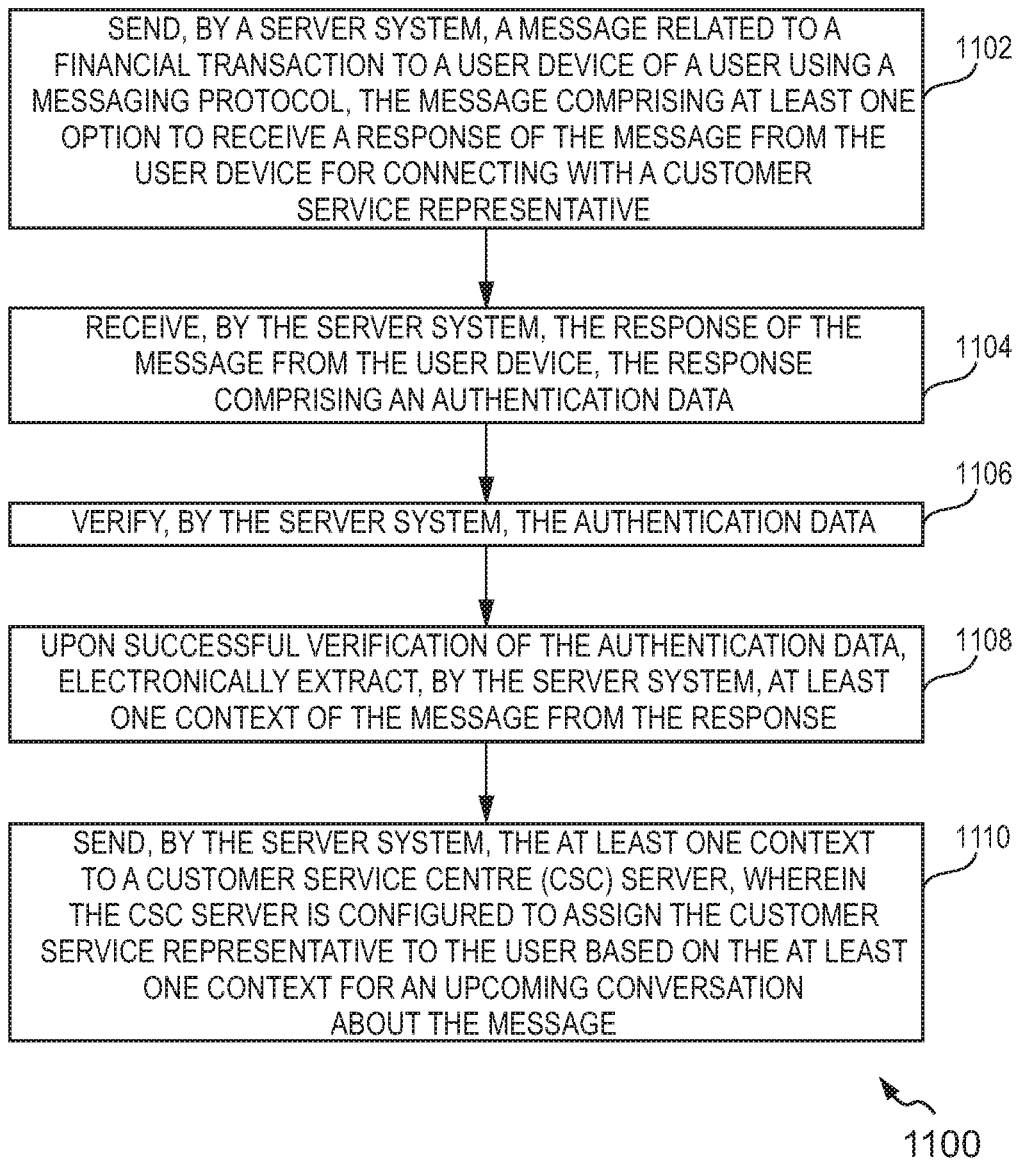
FIG. 11 illustrates a flow diagram of a method for connecting with a customer representative for a financial transaction, in accordance with an example embodiment.

FIG. 11 illustrates a flow diagram of a method 1100 for connecting with a customer service representative for a financial transaction, in accordance with an example embodiment. More specifically, the method 1100 for sending one or more contexts of a customer service message in advance to a customer service centre for connecting with a customer service representative for an upcoming conversation is disclosed. The method 1100 depicted in the flow diagram may be executed by, for example, the at least one server system such as the acquirer server 130, the issuer server 135, the merchant server 120, the message application server 110, the CSC server 115, the wallet server 125, the third-party SMS gateway 105 and the payment server 140 explained with reference to FIG. 1. Operations of the method 1100, and combinations of operation in the method 1100, may be implemented by, for example, hardware, firmware, a processor, circuitry and/or a different device associated with the execution of software that includes one or more computer program instructions. The operations of the method 1100 are described herein with help of the server systems 130, 135, 120, 125, 115, 110, 105 or 140. It is noted that the operations of the method 1100 can be described and/or practiced by using a system other than these server systems. The method 1100 starts at operation 1102.

At 1102, the method includes sending, by a server system, a message related to a financial transaction to a user device of a user using a messaging protocol. The message includes at least one option to receive a response of the message from the user device for connecting with a customer service representative.

At 1104, the method includes, receiving, by the server system, the response of the message from the user device. The response includes an authentication data.

At 1106, the method includes, verifying, by the server system, the authentication data.

Upon successful verification of the authentication data, at 1108, the method includes electronically extracting, by the server system, at least one context of the message from the response.

At 1110, the method includes, sending, by the server system, the at least one context to a Customer Service Centre (CSC) server. The CSC server is configured to assign the customer service representative to the user based on the at least one context for an upcoming conversation about the message. The method stops at 1110.

Figure 12:
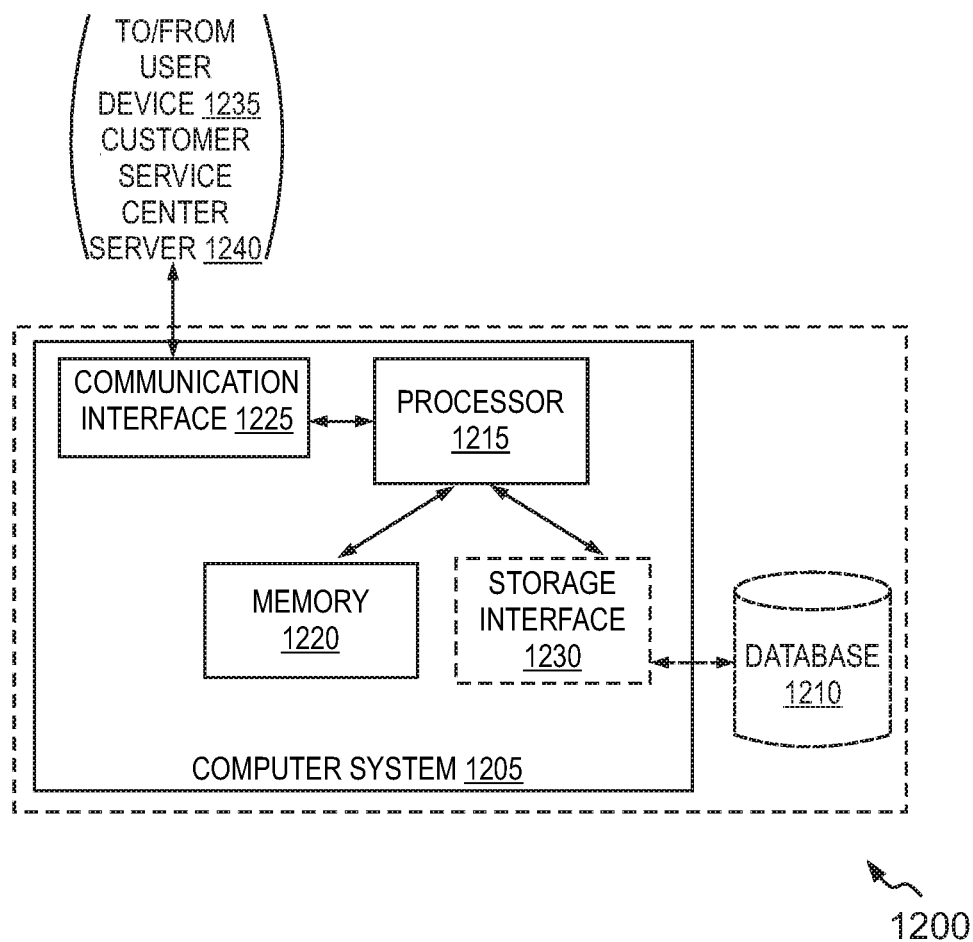
FIG. 12 is a simplified block diagram of a server system, in accordance with one embodiment of the present disclosure.

FIG. 12 is a simplified block diagram of a server system 1200, in accordance with one embodiment of the present disclosure. Examples of the server system 1200 include, but are not limited to, the acquirer server 130, the issuer server 135, the merchant server 120, the message application server 110, the CSC server 115, the wallet server 125, the third-party SMS gateway 105 and the payment server 140. The server system 1200 includes a computer system 1205 and a database 1210.

The computer system 1205 includes at least one processor 1215 for executing instructions. Instructions may be stored in, for example, but not limited to, a memory 1220. The processor 1215 may include one or more processing units (e.g., in a multi-core configuration). The processor 1215 is operatively coupled to a communication interface 1225 such that the computer system 1205 is capable of communicating with a remote device such as a user device 1235 (e.g., the user device 102), a Customer Service Centre (CSC) server 1240 or communicating with any entity within the payment network 145.

The processor 1215 may also be operatively coupled to the database 1210. The database 1210 is any computer-operated hardware suitable for storing and/or retrieving data, such as, but not limited to, transaction data generated as part of sales activities conducted over the bankcard network including data relating to merchants, account holders or customers, and purchases. The database 1210 may also store information related to a plurality of users' payment accounts. Each user account data includes at least one of a user name, a user address, an account number, a contact information, PIN, and other account identifiers. The database 1210 may also store device identifiers, platform IDs of the users etc.

The database 1210 may also store a merchant identifier that identifies each merchant registered to use the payment network 145, and instructions for settling transactions including merchant bank account information (e.g., a plurality of payment accounts related to the merchant interfaces associated with merchants). The database 1210 may further include issuer account information, BINs, human agent information, virtual agent information, biometric information of the users, authentication data, transaction identifier data etc. The database 1210 may include multiple storage units such as hard disks and/or solid-state disks in a redundant array of inexpensive disks (RAID) configuration. The database 1210 may include a storage area network (SAN) and/or a network attached storage (NAS) system.

In some embodiments, the database 1210 is integrated within the computer system 1205. For example, the computer system 1205 may include one or more hard disk drives as the database 1210. In other embodiments, the database 1210 is external to the computer system 1205 and may be accessed by the computer system 1205 using a storage interface 1230. The storage interface 1230 is any component capable of providing the processor 1215 with access to the database 1210. The storage interface 1230 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1215 with access to the database 1210.

The processor 1215 is configured to send a message related to a financial transaction to the user device 1235 of a user using a messaging protocol via the communication interface 1225. The message is sent over the communication network 150. The message includes at least one option to receive a response of the message from the user device 1235 for connecting with a customer service representative/agent. Some non-exhaustive examples of the options include receiving the response via a pre-defined text format, a biometric information, a multimedia message format, a data message from a third-party application etc. The multimedia message further includes one or more of a voice data, an image data, a video data and a text data. The processor 1215 is configured to authenticate/pre-authenticate user using various forms of authentication data. Some non-exhaustive examples of the authentication data include registered mobile number of the user, biometric information, payment card details, mother's maiden name, date of birth and the like. The processor 1215 is further configured to extract one or more contexts of the message from the response by parsing the response. Via the communication interface 1225, the processor 1215 is configured to send the extracted contexts to the CSC server 1240 for agent assignment. The processor 1215 is further configured to receive an assignment notification signal about the agent assignment based on the at least one context of the message from the CSC server 1240. The processor 1215, thereafter, sends a notification message about the agent assignment to the user device 1235 including a pre-determined time limit for connecting with the assigned agent.

Figure 13:
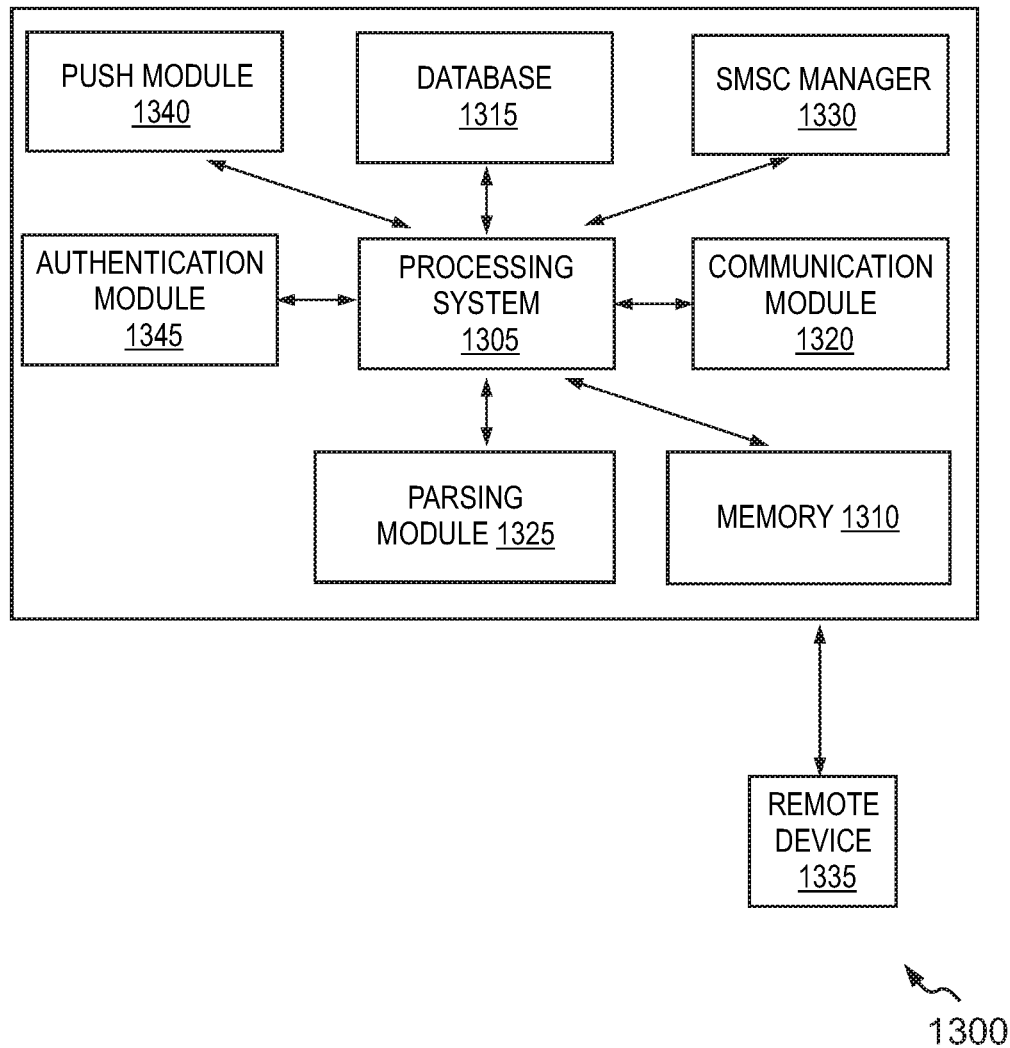
FIG. 13 is a simplified block diagram of a payment server, in accordance with one embodiment of the present disclosure.

FIG. 13 is a simplified block diagram of a payment server 1300, in accordance with one embodiment of the present disclosure. The payment server 1300 may correspond to the payment server—SMS gateway 140 of FIG. 1. As explained with reference to FIG. 1, the payment server 140 is associated with a payment network 145 and provides value added service as an SMS gateway. The payment server 1300 includes a processing system 1305 configured to extract programming instructions from a memory 1310 to provide various features of the present disclosure. The components of the payment server 1300 provided herein may not be exhaustive, and that the payment server 1300 may include more or fewer components than those depicted in FIG. 13. Further, two or more components may be embodied in one single component, and/or one component may be configured using multiple sub-components to achieve the desired functionalities. Some components of the payment server 1300 may be configured using hardware elements, software elements, firmware elements and/or a combination thereof.

In an embodiment, the processing system 1305 may be embodied as one or more of various processing devices, such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The memory 1310 is configured to store machine executable instructions to be accessed by the processing system 1305. The memory 1310 can be any type of storage accessible to the processing system 1305. For example, the memory 1310 may include volatile or non-volatile memories, or a combination thereof. In some non-limiting examples, the memory 1310 can be four to sixty-four Gigabytes (GB) of Dynamic Random Access Memory ("DRAM") or Static Random Access Memory ("SRAM"). In addition, some examples may include supplementary flash memory installed via a PCMCIA slot.

Via the communication interface 1320, the processing system 1305 sends a customized message related to a financial transaction to the user device 1235 through a Short Message Service Centre (SMSC) using the SMS protocols such as Short Message Peer to Peer (SMPP). The processing system 1305 is configured to use an SMSC manager 1330 to select an appropriate SMSC to which the customized SMS is sent. The SMSC is in charge of storing and forwarding messages to and from the mobile station and other short message entities, which is typically a mobile phone/the user device 1235. The benefit of storing messages is that several attempts can be made to deliver a message if the receiving device cannot be contacted. If a wireless recipient is switched off, out of range, or if there is a network outage, the SMS message is stored in the network and delivered when the recipient becomes available again.

The processing system 1305 is also configured to use a push module 1340 to send bulk messages or single push message to user device 1235 over internet using Hyper Text Transfer Protocol (HTTP) via the communication interface 1320. For example, HTTP API allows to send across SMS messages using HTTP Uniform Resource Locator (URL) interface. The payment server 140 may also include an SMS API (not shown) which allows web applications to easily send and receive text messages through logic written for standard web frameworks.

The customized message includes at least one option to receive the response of the message from the user device 1235. The response is received via the communication interface 1320. The response includes an authentication data to be verified by the processing system 1305 using an authentication module 1345. The authentication module 1345 includes various voice recognition algorithms, face recognition algorithms and the like to verify the user identity for a multimedia response. A database 1315 is configured to include contact information (registered mobile number of the user), biometric information, voice data, face image data, user account information, payment card information, transaction history and the like. The processing system 1305 retrieves a corresponding information from the database 1315 to perform authentication.

Further, the response is parsed using a parsing algorithm associated with a parsing module 1325 by the processing system 1305 to extract one or more contexts of the response. The applicable data from the database 1315 is retrieved by the processing system 1305 to send along with the contexts for agent assignment to the CSC server 1240 via the communication interface 1320. The processing system 1305 is also configured to notify the user device 1235 utilizing the SMSC manager 1330 or the push module 1340 to send the message of agent assignment depending on the type of communication network (e.g., cellular network or internet) utilized.

The processing system 1305 is further configured to communicate with one or more remote devices such as a remote device 1335 using the communication interface 1320 over a network such as the network 150 or the payment network 145 of FIG. 1. The examples of the remote device 1335 include, the merchant server 120, the message application server 110, the issuer server 135, the CSC server 1240, the user device 1235, the acquirer server 130, the wallet server 125, other computing systems of issuer and the payment network 145 and the like. The communication interface 1320 is capable of facilitating such operative communication with the remote devices and cloud servers using API (Application Program Interface) calls. The communication may be achieved through API calls, without loss of generality.

Figure 14:
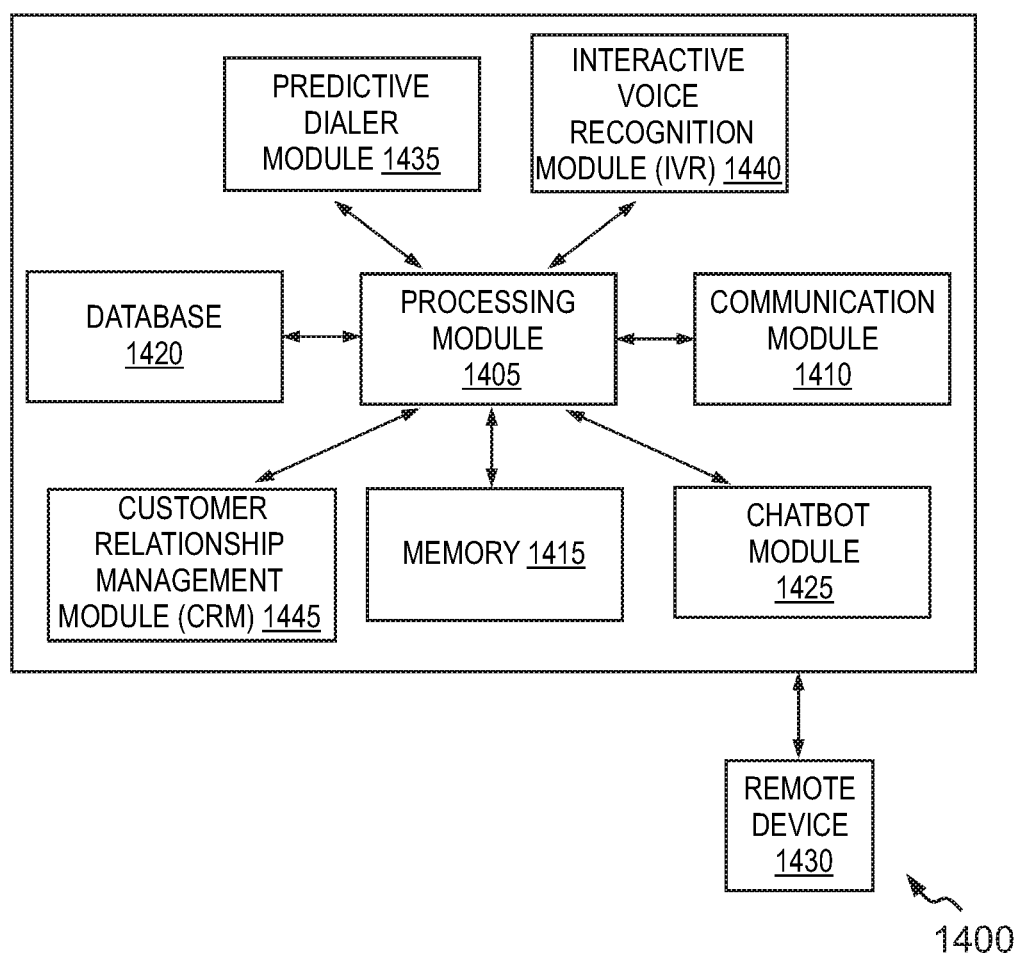
FIG. 14 is a simplified block diagram of a Customer Service Centre (CSC) server, in accordance with one embodiment of the present disclosure.

FIG. 14 is a simplified block diagram of a Customer Service Centre (CSC) server 1400, in accordance with one embodiment of the present disclosure. The CSC server 1400 is an example of the CSC server 115 of FIG. 1 or may be embodied in the CSC server 115. The CSC server 1400 is associated with a third-party customer service center that facilitates customer relationship management for its clients. The CSC server 1400 includes a processing module 1405 communicably coupled to a database 1420, a communication interface 1410, a memory 1415, a chatbot module 1425, a predictive dialer module 1435, an Interactive Voice Recognition (IVR) module 1440 and a Customer Relationship Management (CRM) module 1445. The components of the CSC server 1400 provided herein may not be exhaustive, and that the CSC server 1400 may include more or fewer components than those depicted in FIG. 14. Further, two or more components may be embodied in one single component, and/or one component may be configured using multiple sub-components to achieve the desired functionalities. Some components of the CSC server 1400 may be configured using hardware elements, software elements, firmware elements and/or a combination thereof.

In an embodiment, the communication interface 1410 is capable of facilitating operative communication with a remote device 1430 (e.g., the payment server 140) using API calls. The communication may be achieved over the network 150. The processing module 1405 receives an agent assignment request including one or more contexts of a financial transaction related message for an upcoming conversation with an agent via the communication interface 1410. The CRM module 1445 includes various agent assignment algorithms developed based on various scenarios, such as an agent's availability, his break time, his number of years of experience, his spoken language, and the like. The processing module 1405, in conjunction with the CRM module 1445, determines an agent to be assigned based on the received contexts of the message. Additionally, the CRM module 1445 enables an agent to gather information about a customer (who is on-line) and allows segregation of the customers into different types and determining the value of each type.

The database 1420 includes agent information, such as number of years of experience, his spoken language, his name etc. The database 1420 also includes all the information about the customer/user, such as his name, email address, payment card details, registered mobile numbers, authentication data etc.

The CSC server 1400 includes the predictive dialer module 1435 to predict when agents will be free to take the next call using the call metrics and then dial numbers on the agent's behalf. The dialer uses algorithms to presume the exact time that an agent should be finishing up with a call and then dials another number. When working properly, the predictive dialer module 1435 supplies agents with a steady stream of calls with little-to-no downtime.

The IVR module 1440 generally includes a telephony equipment/a telephony card, software applications, a database, and the support infrastructure. The IVR module 1440 is utilized by the processing module 1405 to route calls to suitable agents. When the user makes a call to the CSC, the IVR module 1440 responds by giving the user a prerecorded greeting and then asks to choose an option from a set menu, for example, by pressing the 'one' on the keypad of the user device 1235, the user will receive a given service. Overall, this results in fewer incoming calls, lower operational costs, and increased productivity for human agents. A telecommunication network connects a caller with the assigned agent. The basic elements of a telecommunication network include public switched telephone network (PSTN), router, long distance carrier (LDC), Ethernet switch, modem etc. Voice over Internet Protocol (VoIP) technology is also used to transmit voice, fax and data to another location through Internet Protocol (IP) network.

The chatbot module 1425 is utilized by the processing module 1405 to provide automated Artificial Intelligence (AI) based solutions such as chatbots that can have a textual or auditory conversation with the user via a weblink over internet. chatbots can efficiently conduct a dialogue, usually substituting other communication tools such as email, phone, or SMS. In banking area, their major application is related to quick customer service answering common requests, and transactional support. The chatbots/virtual agents are assigned over human agents when the context received can be handled by the virtual agents to spare human agents for more complex issue solving. The virtual agents are also assigned when all the human agents are occupied.

When a decision is made by the processing module 1405 about assigning a human agent or a virtual agent, utilizing the applicable modules as explained above, the processing module 1405 sends an agent assignment notification signal to a remote device 1430 such as the payment server 1300 via the communication interface 1320. The notification signal also includes a pre-determined time limit within which the user needs to connect with the assigned agent such that beyond the time limit the assigned agent is free to assist other customers. Therefore, if a human agent is assigned, the IVR module 1440 comes in command and directs the call to the applicable option from the menu directly based on the received context.

Figure 15:
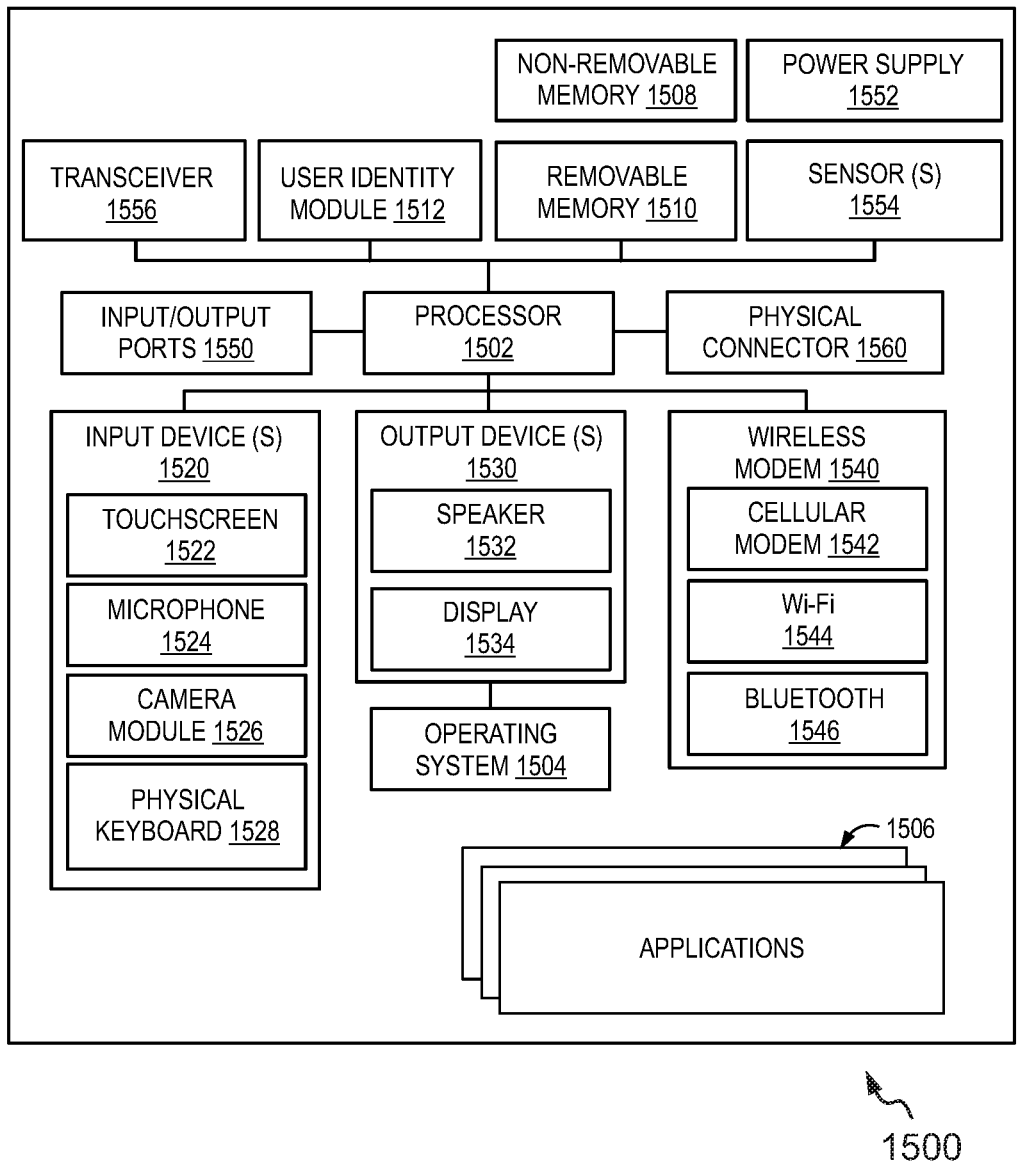
FIG. 15 shows simplified block diagram of a user device capable of implementing at least some embodiments of the present disclosure.

FIG. 15 shows simplified block diagram of a user device 1500 capable of implementing the various embodiments of the present disclosure. For example, the user device 1500 may correspond to the user device 102 of FIG. 1. The user device 1500 is depicted to include one or more applications, such as a merchant application, a wallet application, a payment application, a message application, a bank application or an SMS application. The applications are capable of communicating with any of the servers 115, 120, 125, 130, 135, 105, 110 and 140.

It should be understood that the user device 1500 as illustrated and hereinafter described is merely illustrative of one type of device and should not be taken to limit the scope of the embodiments. As such, it should be appreciated that at least some of the components described below in connection with that the user device 1500 may be optional and thus in an example embodiment may include more, less or different components than those described in connection with the example embodiment of the FIG. 15. As such, among other examples, the user device 1500 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1500 includes a controller or a processor 1502 (e.g., a signal processor, microprocessor, ASIC, or other control and processing logic circuitry) for performing tasks such as signal coding, data processing, image processing, input/output processing, power control, and/or other functions. An operating system 1504 controls the allocation and usage of the components of the user device 1500 and supports for one or more application programs (see, applications 1506), that implements one or more of the innovative features as described herein. In addition, the applications 1506 may include common mobile computing applications (e.g., telephony applications, email applications, calendars, contact managers, web browsers, messaging applications) or any other computing application.

The illustrated user device 1500 includes one or more memory components, for example, a non-removable memory 1508 and/or a removable memory 1510. The non-removable memory 1508 and/or the removable memory

1510 may be collectively known as database in an embodiment. The non-removable memory 1508 can include RAM, ROM, flash memory, a hard disk, or other well-known memory storage technologies. The removable memory 1510 can include flash memory, smart cards, or a Subscriber Identity Module (SIM). The one or more memory components can be used for storing data and/or code for running the operating system 1504 and the applications 1506. The user device 1500 may further include a user identity module (UIM) 1512. The UIM 1512 may be a memory device having a processor built in. The UIM 1512 may include, for example, a subscriber identity module (SIM), a universal integrated circuit card (UICC), a universal subscriber identity module (USIM), a removable user identity module (R-UIM), or any other smart card. The UIM 1512 typically stores information elements related to a mobile subscriber. The UIM 1512 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1500 can support one or more input devices 1520 and one or more output devices 1530. Examples of the input devices 1520 may include, but are not limited to, a touch screen/a display screen 1522 (e.g., capable of capturing finger tap inputs, finger gesture inputs, multi-finger tap inputs, multi-finger gesture inputs, or keystroke inputs from a virtual keyboard or keypad), a microphone 1524 (e.g., capable of capturing voice input), a camera module 1526 (e.g., capable of capturing still picture images and/or video images) and a physical keyboard 1528. Examples of the output devices 1530 may include but are not limited to a speaker 1532 and a display 1534. Other possible output devices can include piezoelectric or other haptic output devices. Some devices can serve more than one input/output function. For example, the touch screen 1522 and the display 1534 can be combined into a single input/output device.

A wireless modem 1540 can be coupled to one or more antennas (not shown in the FIG. 15) and can support two-way communications between the processor 1502 and external devices, as is well understood in the art. The wireless modem 1540 is shown generically and can include, for example, a cellular modem 1542 for communicating at long range with the mobile communication network, a Wi-Fi compatible modem 1544 for communicating at short range with an external Bluetooth-equipped device or a local wireless data network or router, and/or a Bluetooth-compatible modem 1546. The wireless modem 1540 is typically configured for communication with one or more cellular networks, such as a GSM network for data and voice communications within a single cellular network, between cellular networks, or between the user device 1500 and a public switched telephone network (PSTN).

The user device 1500 can further include one or more input/output ports 1550, a power supply 1552, one or more sensors 1554 for example, an accelerometer, a gyroscope, a compass, or an infrared proximity sensor for detecting the orientation or motion of the user device 1500 and biometric sensors for scanning biometric identity of an authorized user, a transceiver 1556 (for wirelessly transmitting analog or digital signals) and/or a physical connector 1560, which can be a USB port, IEEE 1294 (FireWire) port, and/or RS-232 port. The illustrated components are not required or all-inclusive, as any of the components shown can be deleted and other components can be added.

The disclosed method with reference to FIG. 11, or one or more operations of the method 1100 may be implemented using software including computer-executable instructions stored on one or more computer-readable media (e.g., non-transitory computer-readable media), such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the server systems 115, 120, 125, 130, 135, 105, 110 and 140 its various components such as the computer system 1205 and the database 1210 may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and are well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, the method comprising:
    sending, by a server system, a message related to a financial transaction to a user device of a user using a messaging protocol, the message comprising at least one option to receive a response to the message from the user device for connecting with a customer service representative;
    receiving, by the server system, the response to the message from the user device_as a multimedia message, the multimedia message comprising an authentication data;
    verifying, by the server system, the authentication data;
    upon successful verification of the authentication data, parsing the multimedia message, by the server system, to electronically extract at least one context of the message from the response, wherein parsing the multimedia message includes extracting built-in geo location tags from an image captured by the user device; and
    sending, by the server system, the at least one context to a Customer Service Centre (CSC) server, wherein the CSC server is configured to assign the customer service representative to the user based on the at least one context for an upcoming conversation about the message, wherein the assignment of the customer service representative is based on the built-in geo location tags extracted from the image.

2. The method as claimed in claim 1, wherein the message is sent over a communication network using the messaging protocol, wherein the communication network is one of a cellular network and Internet.

3. The method as claimed in claim 2, wherein the at least one option to receive the response of the message from the user device for connecting with the customer service representative is receiving the response in a pre-defined text format.

4. The method as claimed in claim 3, further comprising:
    receiving the response in the pre-defined text format from a registered mobile number of the user;
    verifying the registered mobile number of the user as the authentication data; and
    upon successful verification, parsing the response to extract the at least one context.

5. The method as claimed in claim 2, wherein the at least one option to receive the response of the message from the user device for connecting with the customer service representative is receiving the response encrypted using a biometric information.

6. The method as claimed in claim 5, further comprising:
    verifying the biometric information of the user as the authentication data;
    upon successful verification, decrypting the encrypted response using the biometric information; and
    parsing the response to extract the at least one context.

7. The method as claimed in claim 1, wherein the multimedia message comprises one or more of a voice data, an image data, a video data and a text data.

8. The method as claimed in claim 7, wherein the at least one context is extracted from at least one of a geo location tag associated with the image data and a payment card number of a payment card associated with a registered mobile number of the user.

9. The method as claimed in claim 1, further comprising:
    receiving an assignment notification signal about assigning the customer service representative to the user based on the at least one context of the message for the upcoming conversation about the message from the CSC server, wherein the customer service representative is one of a human agent and a chatbot and wherein the upcoming conversation is one of a voice call, a video call and a text chat; and
    sending a notification message about assignment of the customer service representative to the user device, the notification message comprising a pre-determined time limit for connecting with the customer service representative.

10. A server system, the server system comprising:
    a communication interface configured to:
        send a message related to a financial transaction to a user device of a user using a messaging protocol, the message comprising at least one option to receive a response to the message from the user device for connecting with a customer service representative; and
        receive the response to the message from the user device as a multimedia message, the multimedia message comprising an authentication data;
    a memory comprising executable instructions; and a processor communicably coupled to the communication interface and configured to execute the executable instructions to cause the server system to at least:
  verify the authentication data;
  upon successful verification of the authentication data, parse the multimedia message to electronically extract at least one context of the message from the response, wherein parsing the multimedia message includes extracting built-in geo location tags from an image captured by the user device; and
  send the at least one context to a Customer Service Centre (CSC) server, wherein the CSC server is configured to assign the customer service representative to the user based on the at least one context for an upcoming conversation about the message, wherein the assignment of the customer service representative is based on the built-in geo location tags extracted from the image.

11. The server system as claimed in claim 10, wherein the message is sent over a communication network using the messaging protocol, wherein the communication network is one of a cellular network and Internet.

12. The server system as claimed in claim 11, wherein the at least one option to receive the response of the message from the user device for connecting with the customer service representative is receiving the response in a pre-defined text format.

13. The server system as claimed in claim 12, wherein the server system is further caused to:
  receive the response in the pre-defined text format from a registered mobile number of the user;
  verify the registered mobile number of the user as the authentication data; and
  upon successful verification, parse the response to extract the at least one context.

14. The server system as claimed in claim 11, wherein the at least one option to receive the response of the message from the user device for connecting with the customer service representative is receiving the response encrypted using a biometric information.

15. The server system as claimed in claim 14, wherein the server system is further caused to:
  verify the biometric information of the user as the authentication data;
  upon successful verification, decrypt the encrypted response using the biometric information; and
  parse the response to extract the at least one context.

16. The server system as claimed in claim 11, wherein the at least one option to receive the response of the message from the user device for connecting with the customer service representative is receiving the response as a multimedia message via an application running on the user device.

17. The server system as claimed in claim 16, wherein the multimedia message comprises one or more of a voice data, an image data, a video data and a text data.

18. The server system as claimed in claim 17, wherein the at least one context is extracted from at least one of a geo location tag associated with the image data and a payment card number of a payment card associated with a registered mobile number of the user.

19. A computer program product comprising at least one non-transitory computer-readable storage medium, the computer-readable storage medium comprising a set of instructions, which, when executed by one or more processors in an electronic device, cause the electronic device to at least:
  send a message related to a financial transaction to a user device of a user using a messaging protocol, the message comprising at least one option to receive a response to the message from the user device for connecting with a customer service representative;
  receive the response to the message from the user device as a multimedia message, the multimedia message comprising an authentication data;
  verify the authentication data;
  upon successful verification of the authentication data, parse the multimedia message to electronically extract at least one context of the message from the response, wherein parsing the multimedia message includes extracting built-in geo location tags from an image captured by the user device; and
  send the at least one context to a Customer Service Centre (CSC) server, wherein the CSC server is configured to assign the customer service representative to the user based on the at least one context for an upcoming conversation about the message, wherein the assignment of the customer service representative is based on the built-in geo location tags extracted from the image.

* * * * *